US006760506B2

(12) United States Patent
Laor

(10) Patent No.: US 6,760,506 B2
(45) Date of Patent: Jul. 6, 2004

(54) OPTICAL SWITCH AND SERVO MECHANISM

(76) Inventor: Herzel Laor, 2050 Hillsdale Cir., Boulder, CO (US) 80305

( * ) Notice: Subject to any disclaimer, the term of this patent is extended or adjusted under 35 U.S.C. 154(b) by 159 days.

(21) Appl. No.: 10/063,465

(22) Filed: Apr. 25, 2002

(65) Prior Publication Data

US 2002/0150324 A1 Oct. 17, 2002

Related U.S. Application Data

(63) Continuation-in-part of application No. 09/327,079, filed on Jun. 4, 1999, now Pat. No. 6,526,194.

(51) Int. Cl.[7] .................................................. G02B 6/26
(52) U.S. Cl. .............................. 385/18; 385/16; 385/17; 385/18; 385/33
(58) Field of Search ............................. 385/18, 15, 16, 385/17, 33

(56) References Cited

U.S. PATENT DOCUMENTS

| | | | |
|---|---|---|---|
| 3,349,174 A | 10/1967 | Warschauer | 178/7.6 |
| 3,791,271 A | 2/1974 | Nishikawa | 95/4.5 |
| 4,019,051 A | 4/1977 | Miller | 250/227 |
| 4,253,727 A | 3/1981 | Jeunhomme et al. | 350/96.15 |

(List continued on next page.)

FOREIGN PATENT DOCUMENTS

| | | | | |
|---|---|---|---|---|
| EP | 0 880 040 A3 | 2/1999 | | G02B/6/26 |
| EP | 0 962 796 A2 | 12/1999 | | G02B/6/35 |
| EP | 001220008 A2 * | 3/2002 | | 385/18 |
| GB | 1160546 | 8/1969 | | H04B/9/00 |

OTHER PUBLICATIONS

"Optical Switches: $16 Billion Worth?," ElectroniCast Corporation, 1 p., Feb. 12, 2001.
"Optical Fiber Cross Connect System, Model OMS–100," NTT AFTY Corporation, Mechatronics Application Division, 2 pp., Jan., 2001.
"IntelliSuite™ CAD for MEMS," IntelliSense Corporation, 4 pp.
"We are Unparalled," *IEEE Communications Magazine*, #10 at www.comsoc.org/productinnovations.

Primary Examiner—Brian Healy
(74) Attorney, Agent, or Firm—Kilpatrick Stockton LLP

(57) ABSTRACT

The present invention is directed to an optical switch for switching the light from one of a plurality of inputs to one of a plurality of outputs. The switch contains at least two moveable mirrors constructed using MEM technology and a servo mechanism connected to the moveable mirrors to be used in mirror, input and output alignment. These switches are useful in applications such as fiber-fiber switches and optical disk drives. The switches may be combined with other optical equipment including stationary mirrors and lenses, such as focusing lenses, to optimize optical transmission.

33 Claims, 33 Drawing Sheets

U.S. PATENT DOCUMENTS

| | | | |
|---|---|---|---|
| 4,270,839 A | 6/1981 | Cross | 350/96.15 |
| 4,365,863 A | 12/1982 | Broussaud | 350/96.15 |
| 4,378,144 A | 3/1983 | Duck et al. | 350/96.18 |
| 4,470,662 A | 9/1984 | Mumzhiu | 350/96.15 |
| 4,507,763 A | 3/1985 | Kato | 369/44 |
| 4,614,868 A | 9/1986 | Alster | 250/227 |
| 4,790,617 A | 12/1988 | Campbell et al. | 350/96.15 |
| 4,820,045 A | 4/1989 | Boisde et al. | 356/319 |
| 4,834,482 A | 5/1989 | Campbell et al. | 350/96.15 |
| 4,838,631 A | 6/1989 | Chande et al. | 350/6.6 |
| 4,838,637 A | 6/1989 | Torok et al. | 350/96.18 |
| 4,896,935 A | 1/1990 | Lee | 350/96.2 |
| 5,005,934 A | 4/1991 | Curtiss | 350/96.15 |
| 5,009,479 A | 4/1991 | Morrison | 350/96.15 |
| 5,146,521 A | 9/1992 | Hartog | 385/48 |
| 5,153,870 A | 10/1992 | Lee et al. | 369/111 |
| 5,199,088 A | 3/1993 | Magel | 385/18 |
| 5,420,946 A | 5/1995 | Tsai | 385/22 |
| 5,452,283 A | 9/1995 | Lee et al. | 369/112 |
| 5,475,779 A | 12/1995 | Uken et al. | 385/32 |
| 5,524,153 A | 6/1996 | Laor | 385/16 |
| 5,627,669 A | 5/1997 | Orino et al. | 359/156 |
| 5,629,993 A | 5/1997 | Smiley | 385/22 |
| 5,647,033 A | 7/1997 | Laughlin | 385/16 |
| 5,671,304 A | 9/1997 | Duguay | 385/17 |
| 5,788,453 A | 8/1998 | Donde et al. | 414/751 |
| 5,796,711 A | 8/1998 | Tomita et al. | 369/275.4 |
| 5,872,880 A | 2/1999 | Maynard | 385/88 |
| 6,002,818 A | 12/1999 | Fatehi et al. | 385/17 |
| 6,044,705 A | 4/2000 | Neukermans et al. | 73/504.02 |
| 6,091,867 A | 7/2000 | Young et al. | 385/17 |
| 6,097,858 A | 8/2000 | Laor | 385/16 |
| 6,097,859 A | 8/2000 | Solgaard et al. | 385/17 |
| 6,097,860 A | 8/2000 | Laor | 385/17 |
| 6,101,299 A | 8/2000 | Laor | 385/16 |
| 6,137,941 A | 10/2000 | Robinson | 385/140 |
| 6,212,309 B1 | 4/2001 | Nguyen et al. | 385/17 |
| 6,295,154 B1 | 9/2001 | Laor et al. | 359/223 |
| 6,356,377 B1 * | 3/2002 | Bishop et al. | 359/290 |
| 6,522,802 B2 * | 2/2003 | Hoen | 385/18 |
| 6,526,194 B1 * | 2/2003 | Laor | 385/18 |
| 2002/0181846 A1 * | 12/2002 | Hoen | 385/18 |

* cited by examiner

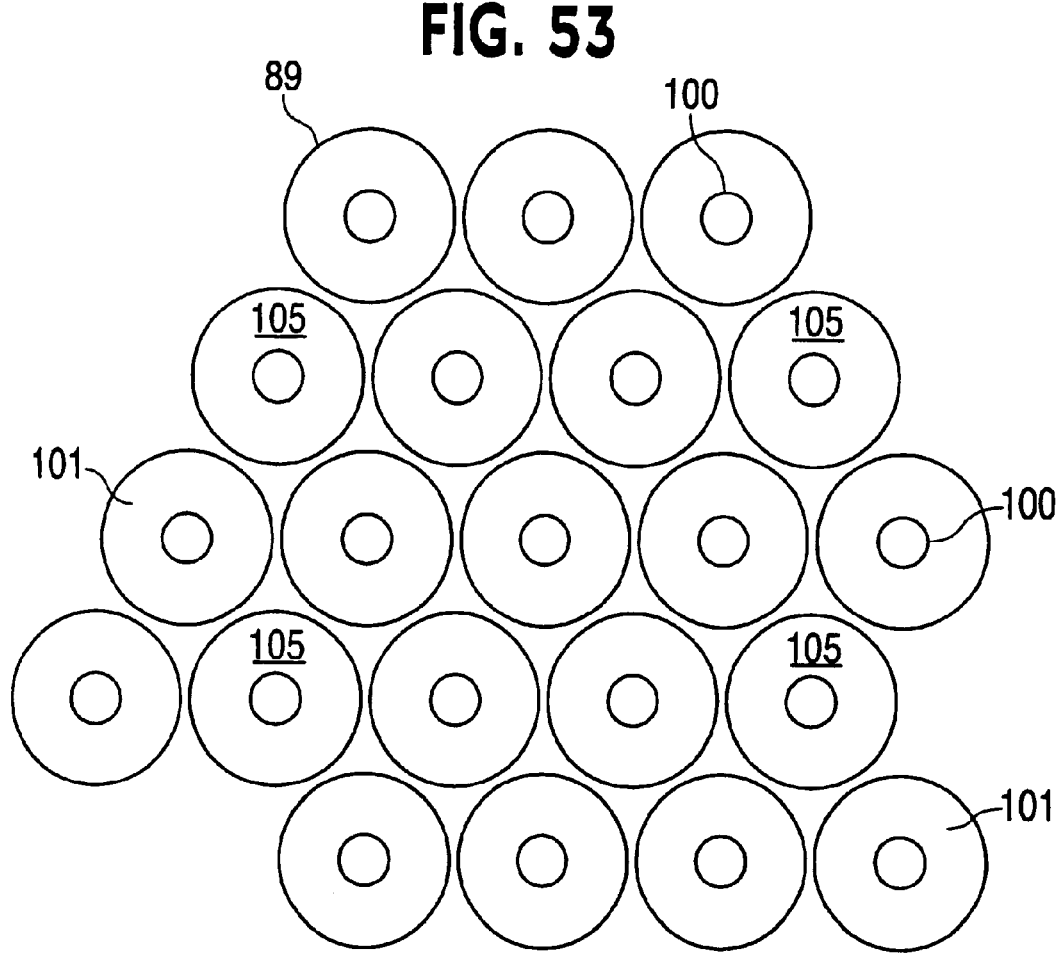

OPTICAL SWITCH AND SERVO MECHANISM

CROSS REFERENCE TO RELATED APPLICATIONS

This Application Is A Continuation-In-Part Application of U.S. application Ser. No. 09/327,079 Filed Jun. 4, 1999 now U.S. Pat. No. 6,526,194.

BACKGROUND OF INVENTION

1. Field of the Invention

The present invention generally relates to optical switches and, in particular, to optical switches having servo control mechanisms and focusing components.

2. Background of the Invention

Current optical switches, such as fiber to fiber switches, use various mechanisms to switch light beams from an input to a selected output. For instance, piezoelectric actuators are used to move fibers in the focal plane of lenses to create a directional optical transmitter or receiver. Alternatively, the fiber is held in a fixed position in the center of the focal plane of the lens and the beam is directed to the desired location with one or more moveable mirrors. The output of the beam is determined by controlling the mirrors within the switch. Optical switches can be used to switch light in various applications including fiber to fiber switches and in multi-disk optical disk drives.

In the case of optical disk drives, optical switches can be used to direct a beam of light from a single light source to any one of a number of optical disks. In general, various optical disk drive systems have been proposed for use with multiple optical disks loaded on a rotationally mounted spindle, and such systems have become increasingly popular because of their large storage capabilities. A typical optical disk drive system uses one or more laser sources to transmit a laser beam onto a selected track of an optical disk. In reading applications, the beam reflected from the surface of the optical disk is monitored by a signal detector to reconstruct information stored on the recording surfaces of disks.

Some of the existing multiple disk drive systems use a single head assembly mounted on an elevator carriage, which physically moves within the drive to bring the laser beam to each reflective disk surface. Some of the existing multiple disk drive systems use a multiple head assembly system, where one head assembly is assigned to each of reflective surfaces of the optical disks. Others, such as disclosed in U.S. Pat. No. 5,153,870 to Lee et al., provide a rotary head actuator which employs an optically switchable reflector using removeable index matching fluid to distribute a laser beam from a laser source to one of several optical disks.

These prior art storage devices suffer from various disadvantages. For example, one problem associated with some of the known storage devices is that additional access time is required during positioning of the laser beam between optical disks. This problem is more prevalent when the requested data is dispersed among multiple disk surfaces. Some storage devices are expensive to manufacture and cumbersome to fit into small cases since each head assembly contains a complete set of optical head components, including laser beam source, detector, mirrors and lenses.

SUMMARY OF INVENTION

The present invention is directed to an optical switch for switching a light beam from at least one optical input to one of a plurality of outputs. The optical switch includes a first moveable mirror for reflecting the light beam from the optical input and a second moveable mirror for reflecting the light beam reflected from the first moveable mirror, wherein the first moveable mirror is adjusted to guide the light beam from the optical input to a selected point on the second moveable mirror, and the second moveable mirror is adjusted to guide the light beam from the first moveable mirror to one of the outputs.

In the optical switch of the present invention, the first and second moveable mirrors are rotatable about at least one pivot axis, and the optical switch further includes a control mechanism to control the rotation of the first and second moveable mirrors about the pivot axis. In one embodiment of the present invention, the first and second moveable mirrors are rotatable about both a first pivot axis and a second pivot axis, and the optical switch further includes a control mechanism to control the rotation of the first and second moveable mirrors about both axes.

In another embodiment, the optical switch includes a plurality of optical inputs, and the first moveable mirror is adjusted to guide the light beam emitted from one of these plurality of optical inputs to a selected point on the second moveable mirror.

In one embodiment of the present invention, the mirror, includes a top reflective surface, a bottom surface opposite the top surface, a magnetic material attached to at least a portion of the bottom surface, and at least one magnetic coil for attracting the magnetic material to rotate the moveable mirrors. In another embodiment, the moveable mirrors also include a support frame, a gimbal frame rotatably connected to the support frame, and a mirror portion rotatably connected to the gimbal frame, wherein the mirror is rotatable about a first axis of rotation and the gimbal frame is rotatable about a second axis of rotation.

In yet another embodiment of the optical switch, the mirror portion further includes a top reflective surface and a bottom surface opposite the top surface, and the optical switch also includes a magnetic material attached to at least a portion of the bottom surface of the mirror portion and at least a portion of the gimbal frame. A first set of magnetic coils for attracting the magnetic material attached to the mirror portion is positioned adjacent to the magnetic material on the mirror portion to rotate the mirror about the first axis of rotation, and a second set of magnetic coils is positioned adjacent to the magnetic material on the gimbal frame for attracting the magnetic material on the gimbal frame to rotate the mirror about the second axis of rotation. A wing structure can be attached non-rotatably to the mirror portion, and the magnetic material attached to the wing structure.

The optical switch of the present invention can also include a damping material disposed between the magnetic material and the magnetic coils. Suitable materials for the dampening material include aluminum and copper. The magnetic coils are electromagnets. The magnetic material can be a permanent magnet that is polarized in a direction perpendicular to the bottom surface or in a direction parallel to the bottom surface.

The present invention is also directed to an adjustable mirror assembly having a support base, a mirror having a reflective surface and connected to the support base by a first flexible pivot, and two linear actuators connected to the mirror by a second flexible pivot and a third flexible pivot, wherein movement of the second and third pivots by the linear actuators provides two degrees of rotational freedom to the reflective surface of the mirror with respect to the first flexible pivot. The linear actuators can be operatively associated with an optical disk drive controller so as to direct an optical beam to a selected disk location. In addition, the linear actuator and the optical disk drive controller can cooperate to manipulate the reflective surface so as to control tracking and focusing of the optical beam with respect to an optical disk.

The present invention is further directed to optical devices such as optical disk drives, which may be enhanced by incorporating one or more of the moveable mirrors of the present invention to effectively switch a laser beam from at least one light source to one of a plurality outputs, such as read/write heads of an optical storage device.

The present invention is also directed to an apparatus and corresponding method for selectively directing a light beam from at least one light source to a number of outputs. The beam-directing apparatus uses at least one moveable mirror having a reflective surface which is capable of changing its orientation to direct the light beam in a selected optical path. In a preferred embodiment, the beam-directing apparatus uses two moveable mirrors, where each moveable mirror is capable of rotating with respect to at least one pivot axis to selectively guide the light beam to one of the outputs.

According to one aspect of the invention, the beam-directing apparatus can be used with an optical disk drive for selectively coupling a beam of light from a laser module to a selected optical disk surface. In a preferred embodiment, the beam-directing apparatus uses two moveable mirrors together with stationary mirrors. Each moveable mirror is capable of rotating with respect to at least one pivot axis to guide the light beam to one of the stationery mirrors. According to the invention, the optical disk drive has a plurality of head members positioned near surfaces of a plurality of optical disks to optically read and/or write information from and onto the optical disks rotatably supported about a spindle. The head members preferably include at least one set of a head mirror and an R/W objective lens located between the head mirror and the respective disk for receiving the beam of light from the beam-directing apparatus and focusing the received light beam onto a selected track of the disk.

According to another aspect of the invention, one or more moveable mirrors, of any suitable type, are used in the optical switching apparatus so as to enable the light beam to be rapidly and accurately guided along a precise optical path, as required by the optical disk drive. The moveable mirrors may include a moveable reflective surface which is adjustable about at least one pivot axis and preferably about two pivot axes. The moveable mirror is associated with a control mechanism for precisely controlling the orientation of the reflective surface in one or both pivot axes. A processor may be coupled to the control mechanisms of the moveable mirrors in order to coordinate their movements to selectively switch the optical path of the laser beam between different optical read/write head members.

According to a further aspect of the invention, a plurality of stationary mirrors is provided, each associated with one of said head members. The stationary mirrors reflective surfaces oriented at a predetermined pivotal angle to deflect the light beam from the second moveable mirror to a respective head member. Although referred to herein as "stationary", such mirrors may be mounted on and move with an actuator arm, but can be stationary with respect to the mount.

The reading and writing operations are executed by first moving the read/write head associated with such optical disk to a specific target track area thereof. The laser beam emitted by the laser source is reflected by the first and second moveable mirrors to one of the stationary mirrors. A processor controls the movements of the first and second moveable mirrors to precisely guide the light beam to a specific spot on the selected stationary mirror, such that the beam from the stationary mirror is deflected by a head mirror and guided to the center of an R/W objective lens associated with the selected optical disk. The beam reflected from the surface of the optical disk is monitored by a signal detector to reconstruct information stored on the recording surface of the disk.

In one aspect of the invention, the optical switching apparatus includes a feedback mechanism for monitoring the position of the moveable mirrors. The feedback mechanism may include an auxiliary light source for generating an auxiliary light beam and a position sensitive detector for detecting the auxiliary light beam deflected from the moveable mirror in order to accurately determine the position thereof.

In another aspect of the invention, an optical disk drive is provided in which a control mechanism is used with a beam-directing apparatus for controlling the operations of the beam-directing apparatus. The beam-directing apparatus may include two moveable mirrors, the orientations of which are precisely controlled by control mechanism. The moveable mirrors together with the control mechanism are capable of rapidly and accurately guiding a light beam from a selected light source to a precise optical path.

In yet another aspect of the invention, an optical disk drive is provided in which the size of the beam reflected onto an optical disk surface may be controllable by a beam apparatus. The focusing of the beam on an optical disk surface may be controlled with use of two moveable mirrors, accomplished by controlling the position of the laser beam impinging upon the second moveable mirror with the first moveable mirror. In a related aspect of the invention, the tracking of the beam on the optical disk surface may also be controlled by controlling the position of the laser beam impinging upon the second moveable mirror with the first moveable mirror.

In a further aspect of the invention, a moveable mirror is provided. The moveable mirror includes a reflector rotatable about at least one pivot axis. The reflector is adjustably supported between a support surface and at least one actuator so as to cause the reflector to rotate about pivot axis in either direction as the actuator moves toward or away the reflector. This moveable mirror may be used in the read/write head members so that the orientation of its reflector may be adjusted, as required for focusing and tracking needs.

The present invention is also directed to servo mechanisms to control the alignment of the moveable mirrors in the optical switch and to control the alignment of the optical inputs and outputs. Various servo mechanisms are possible as shown, for example, in U.S. Provisional Application No. 60/088,240, the entire disclosure of which is incorporated herein by reference. Focusing components such as focusing lens are also used in the optical switch of the present invention to maximize optical focusing.

BRIEF DESCRIPTION OF DRAWINGS

FIG. 17 is a schematic of the moveable mirror and electromagnet with a damping mechanism there between;

FIG. 53 is a partial end view of a bundle of optical fibers.

DETAILED DESCRIPTION

Figure 1:
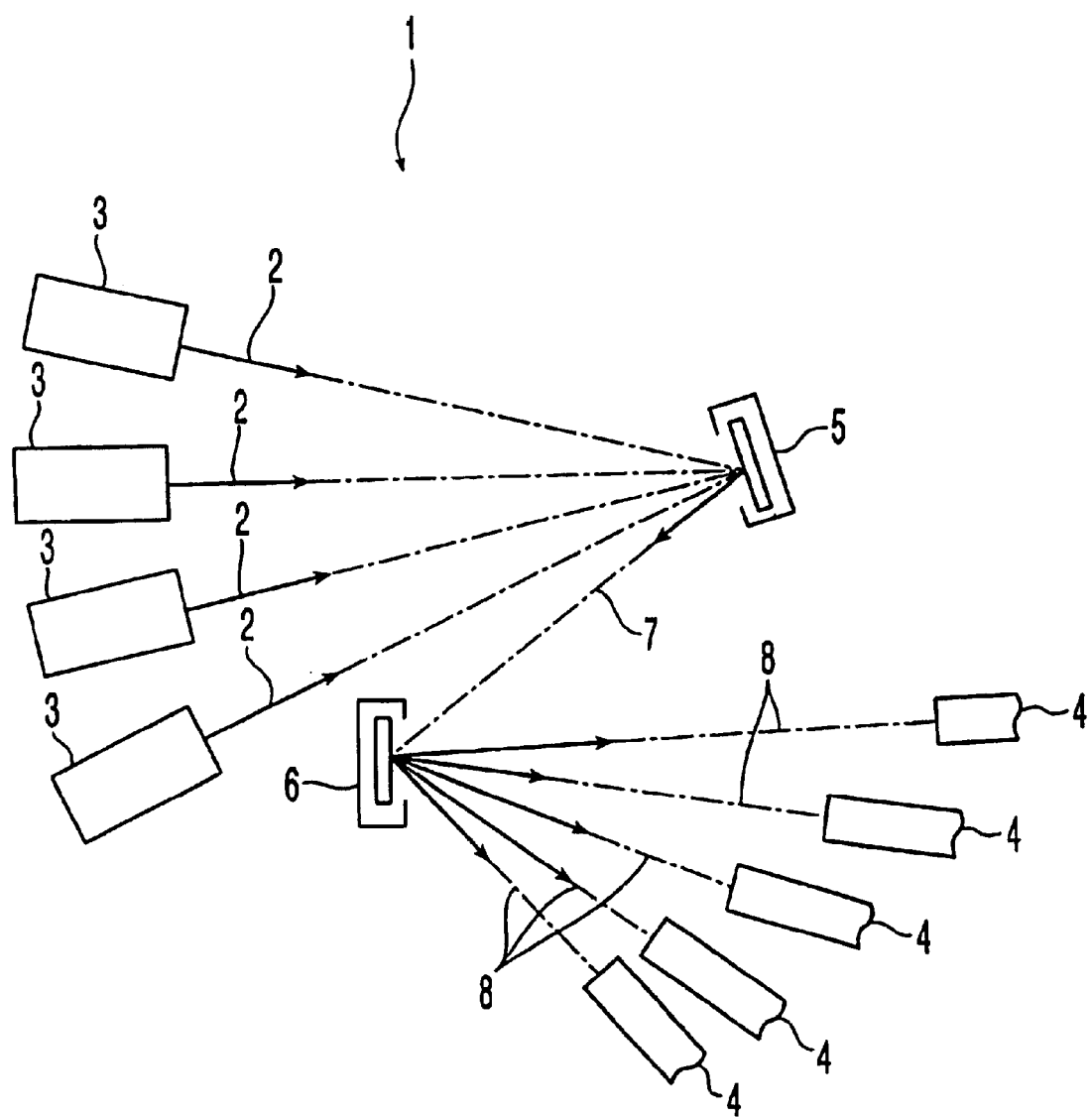
FIG. 1 is a schematic view of the optical switch of the present invention.

Referring initially to FIG. 1, an arrangement for an optical switch 1 according to the present invention is shown. The optical switch 1 is capable of switching an incoming light beam 2 from any one of a plurality of light sources or inputs to any one of a plurality of outputs 4. Suitable light sources 3 include lasers, fiber optic cables or bundles and other light emitting or transporting sources, and suitable outputs 4 include optical lenses, fiber optic cables or bundles, and other light transporting or detecting apparatuses.

The optical switch includes at least one moveable mirror and preferably at least two moveable mirrors, a first moveable mirror 5 and a second moveable mirror 6. An incoming light beam 2 from one of the light sources 3 is incident upon the first moveable mirror 5, and the first moveable mirror is adjusted to guide an intermediate reflected light beam 7 to be incident at a selected point or location on the second moveable mirror 6. Similarly, the second moveable mirror 6 is adjusted to guide a reflected outgoing light beam 8 to one of the outputs 4. FIG. 1 shows various potential paths of the incoming light beams 2 and outgoing light beams 8. In addition, one or more lenses, such as focusing or collimating lenses, or additional stationary mirrors may be placed in one or more of the potential paths of the outgoing light beams between the second moveable mirror 6 and the outputs 4.

Figure 2:
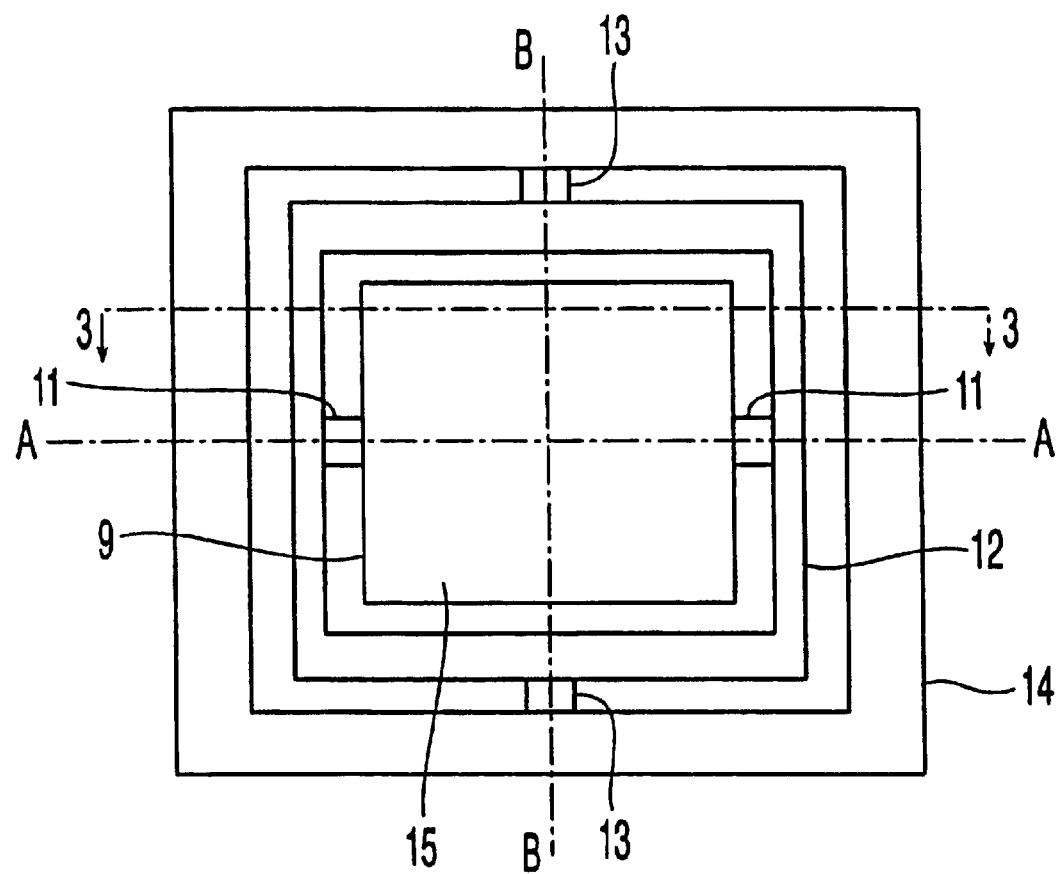
FIG. 2 is a plan view of a moveable mirror of the present invention.

The first and second moveable mirrors 5, 6 are adjusted by pivoting them about at least one pivot axis. Preferably, the moveable mirrors are adjusted by pivoting them about at least two pivot axes, providing two degrees of rotational freedom for the adjustment of the moveable mirrors. Two degrees of freedom provides a higher degree of focusing of the light beams especially as is required in fiber optics switch applications. A control mechanism is used to control the degree of rotation of the moveable mirrors about the pivot axes. Preferably, a Micro Electro Machined ("MEM") mirror is used as the moveable mirror to provide the best performance for optical switching. MEM refers to technologies used to fabricate mechanical structures in a process similar to the process of making electronic chips out of materials such as silicon. Alternatively, the technology is referred to as "MEMS," for "Micro Electro Mechanical Systems." An arrangement for the moveable mirrors built according to MEM technology is illustrated in FIG. 2. This arrangement utilizes a gimbaled configuration to achieve two degrees of rotational freedom. A central mirror portion 9 is rotatably attached by a first set of hinges 11 to a gimbal frame 12. The gimbal frame 12 is rotatably attached by a second set of hinges 13 to a support frame 14 such as a silicon chip. The first set of hinges 11 permit the central mirror 9 to rotate about a first axis A, and the second set of hinges 13 permits the mirror portion 9 to rotate about a second axis B. Suitable materials for the mirror 9 include a single crystal material such as silicon, metal, ceramic or other suitable material. The hinges 11, 13 can be formed from the same material as the mirror 9 or different materials can be used.

Figure 3:
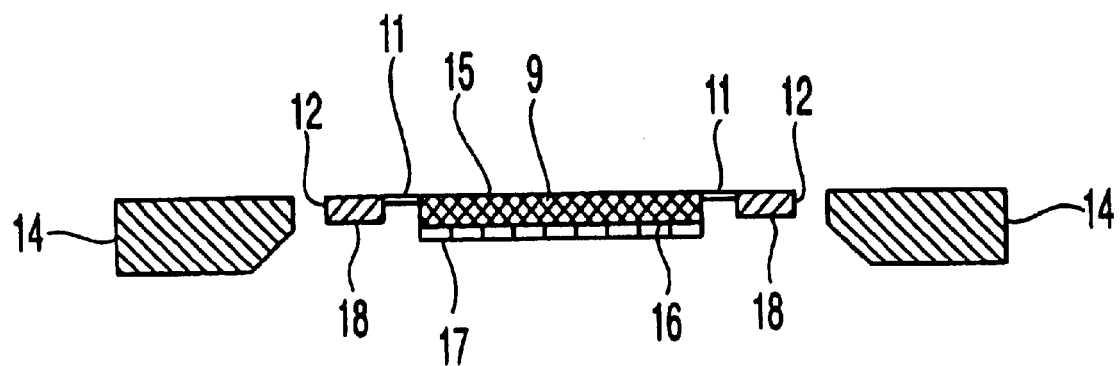
FIG. 3 is a view through line 3—3 of FIG. 2.

As is best shown in FIG. 3, the central mirror 9 includes a top face or surface 15 and a bottom face 16. The central mirror and the top and bottom faces may be any shape desired including circular and triangular. Preferably, the central mirror and the bottom faces are generally rectangular. The top face 15 is a reflective surface. Attached to the bottom face or surface 16 is a magnetic material 17. A similar magnetic material 17 can be added to the gimbal bottom surface 18. Various arrangements and types of magnetic material 17 are possible depending upon the mechanisms employed to move the mirror 9.

Figure 4:
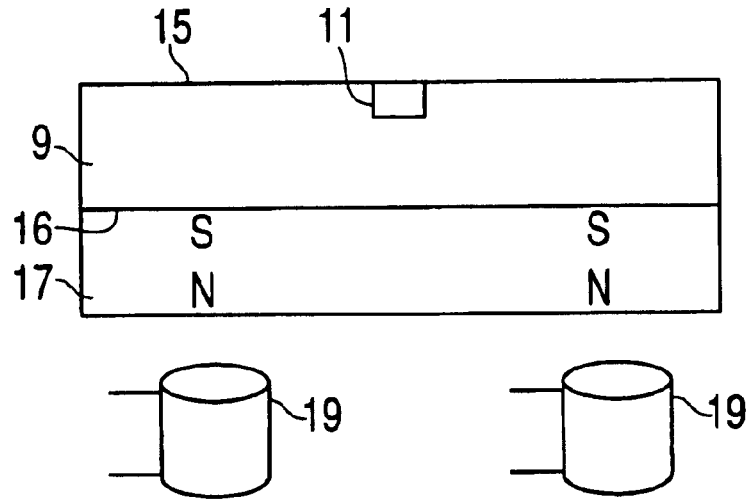
FIG. 4 is a schematic of the moveable mirror and magnetic coils of the present inventor.
Figure 5:
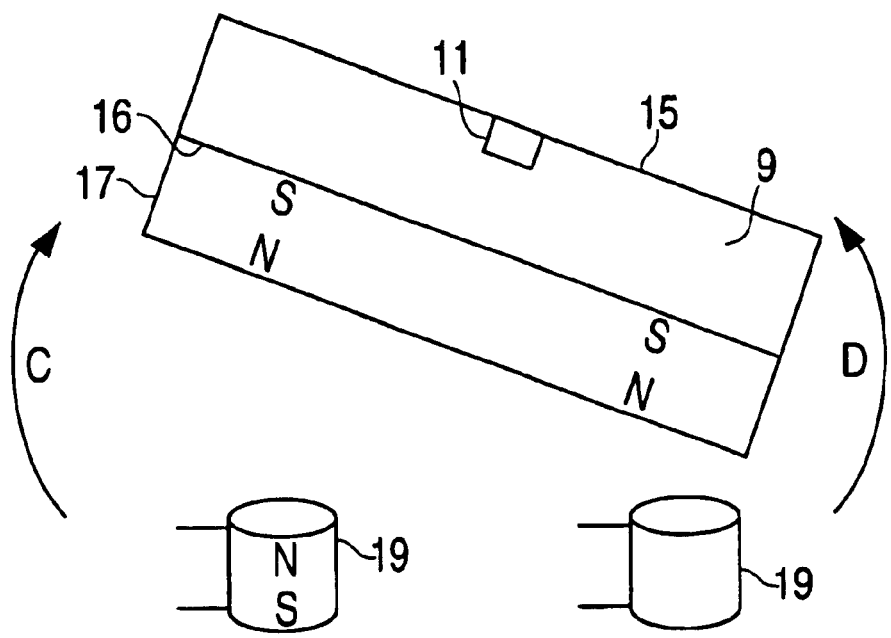
FIG. 5 is a schematic of the moveable mirror and magnetic coils of the present invention is a second position.

In a first embodiment as illustrated in FIGS. 4 and 5, the magnetic material 17 is polarized in a direction that is perpendicular to the bottom face 16 of the mirror 9. This polarity is indicated as North ("N") and South ("S"). A plurality of magnetic coils 19 are provided adjacent the magnetic material. Preferably, two magnetic coils 19 are provided for each degree of rotational freedom of the mirror 9. The magnetic coils 19 produce a magnetic field when carrying an electric current. The magnetic coils 19 create a magnetic field which attracts or repels the magnetic layer 15 depending upon the applied current.

The rest position of the mirror 9 is shown in FIG. 4. In FIG. 5, a current is applied to one of the magnetic coils 19, inducing a magnetic field having the indicated polarity. The resulting repelling force between the magnetic coil 19 and the magnetic material 17 will cause the mirror 9 to rotate about the hinge 11 in the direction of arrow C. The flexure force in the hinge 11 will create a force in the direction of arrow D that opposes the rotational repelling force. As a result, the mirror 9 will come to rest at an angular position or deflection where the magnetic repelling force equals the hinge flexure force. Any desired angular position of the mirror 9 can be reached by applying proper currents to the magnetic coils 19.

Although a current may be applied to the magnetic coils 19 to attract the magnetic material 17, from a servo control point of view, pushing the mirror 9 away by the magnetic coils 19 is preferable to pulling the mirror 9 toward the magnetic coils 9. A reason for this preference is that if there is a small perturbation in the angular position of the mirror 9 when the magnetic coils 19 are polarized to attract the magnetic material 17, the flexure force of the hinge 11 and the attracting force will act in combination to rotate the mirror toward the coil, until the mirror 9 contacts the coil 19. This problem is avoided by using a repelling magnetic force to position the mirror 9.

For example, if in FIG. 5, a small perturbation is applied to the mirror 9, say by forcing a small rotation in the direction of arrow C, the mirror 9 will rotate farther from the polarized magnetic coil 19. As a result, the magnetic repelling force will decrease while the flexure force in the hinge 11 increases, causing the mirror 9 to return to the angular position where these two forces are balanced. Similarly, if the small perturbation was in the direction of arrow D, then the magnetic repelling force will increase while the flexure force in the hinge decreases, again causing the mirror 9 to return to the angular position where these two forces are balanced.

Conversely, if the polarity of the magnetic coil in FIG. 5 was reversed to pull the mirror 9, the perturbations described above would cause the magnetic and flexure forces to both either increase or decrease, producing an instability that could lead to a run-away situation. In addition, the flexure force of the hinge 11 is linearly related to the angular displacement of the mirror 9, but the magnetic force is related to the inverse square of the distance between the magnetic coil 19 and the mirror 9. Therefore, a small perturbation of the mirror 9 towards the magnetic coil 19 will cause an increase in the magnetic attracting force that is greater than any increase in the flexure force of the hinge 11, permitting the mirror to run away or rotate until contacting the magnetic coil 19. Although this run-away situation can be avoided by spacing the magnetic coil 19 a sufficient distance away from the magnetic material 17 of the mirror 9 to avoid the steep non-linearity of the magnetic force, such spacing will also reduce the total magnetic force that the magnetic coil 19 is applying to the magnetic material 17 for a given amount of current, requiring larger coils, increased current load, or a combination of the two to move the mirror 9 in addition to just being more unstable in a static situation, pulling magnetic forces provide a more stable dynamic system when the mirror 9 is being changed or adjusted from one position to another. In the dynamic system, magnetic pulling forces are applied to the magnetic material 17 of the mirror 9, typically for short periods of time, to move the mirror from one angular position to another angular position. In general, such adjustments are made while carefully considering system stability.

When two magnetic coils 19 are used, as is illustrated in FIGS. 4 and 5, both magnetic coils 19 can apply simultaneous magnetic repulsion or magnetic push. This simultaneous application of push forces increases the positional stiffness of the mirror 9 as both forces are working against each other. The actual position or angular deflection of the mirror will occur when the larger of the two push forces is equal to the sum of the flexure force of the hinge 11 and the smaller push force. In this position a small perturbation of the mirror 9 will change the strong force more than the weak force, further adding to the stability of the mirror 9.

Figure 6:
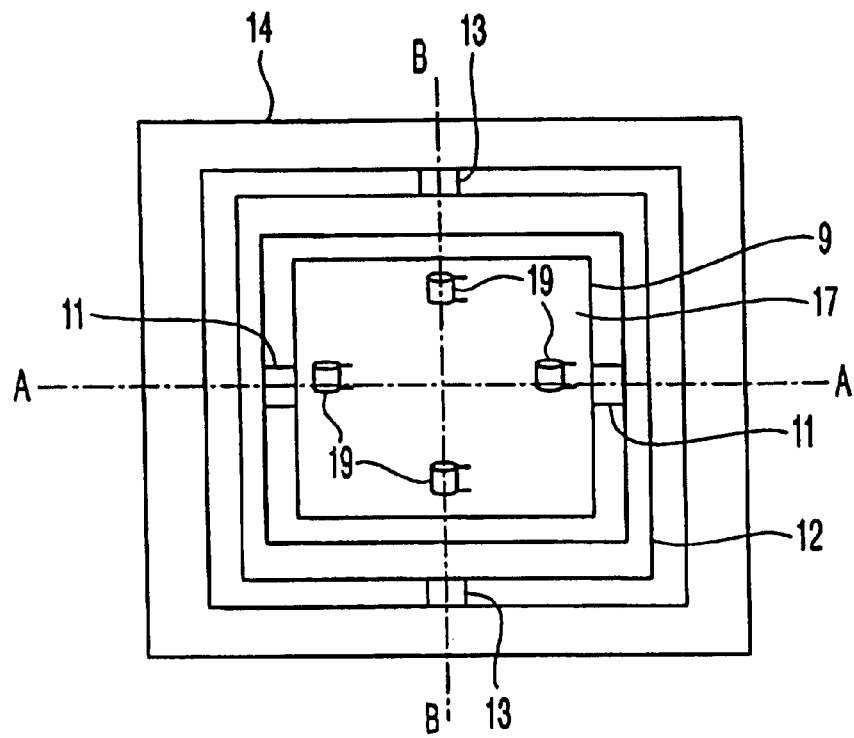
FIG. 6 is a plan view of the moveable mirror showing an arrangement of magnetic coils.
Figure 7:
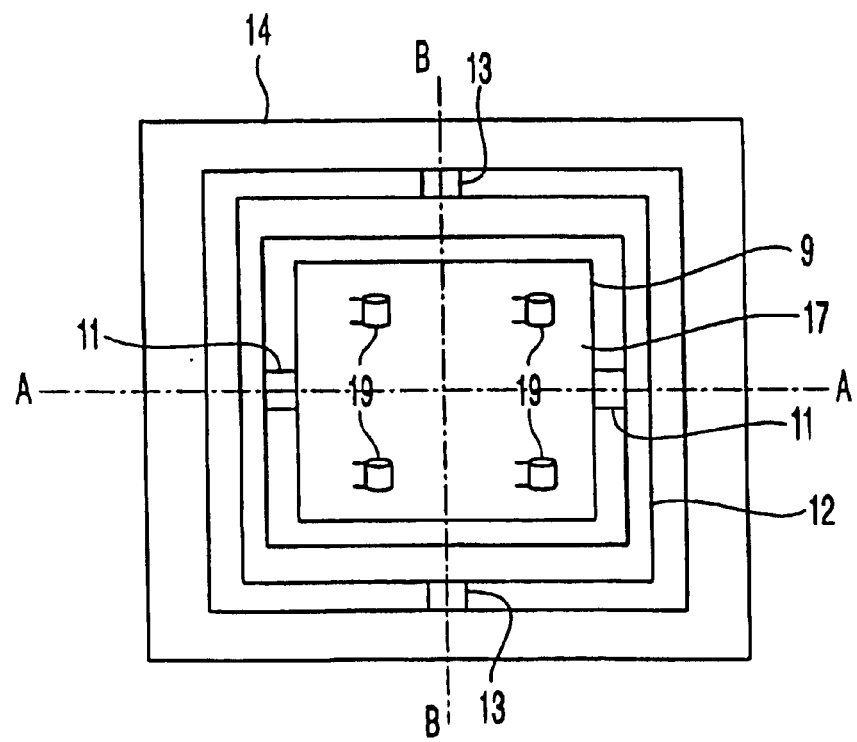
FIG. 7 is a plan view of the moveable mirror showing another arrangement of magnetic coils.
Figure 8:
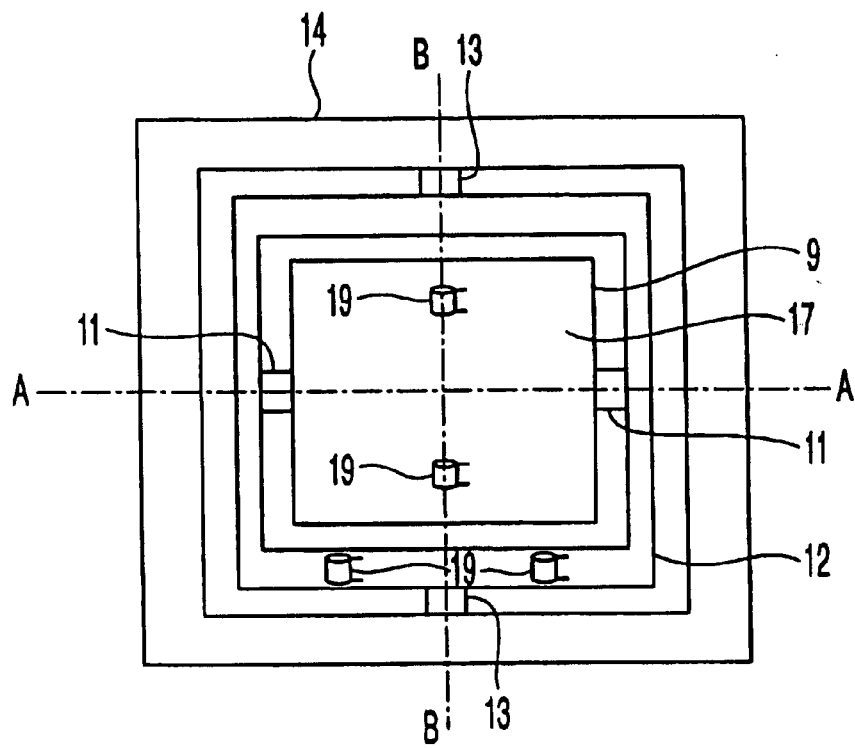
FIG. 8 is a plan view of the moveable mirror showing yet another arrangement of the magnetic coils.

Referring to FIGS. 6–8, various arrangements of the magnetic coils 19 in relationship to the magnetic material 17 of the mirror 19 are possible. Preferably, there are two magnetic coils 19 for each degree of rotational freedom or movement. The arrangement shown in FIG. 6, with two degrees of rotational freedom, avoids interference between the two axes. In FIG. 7, each axis is influenced by all four coils, requiring a more complex drive mechanism or algorithm than the arrangement of FIG. 6. In FIG. 8, a first set of coils 19 are disposed adjacent to and apply force to the magnetic surface 17 of the mirror 9, controlling rotation about the first axis of rotation A, and a second set of coils 19 are disposed adjacent to and apply force to magnetic material attached to the bottom surface 18 of the gimbal frame 12, controlling rotation about the second axis of rotation B.

Figure 9:
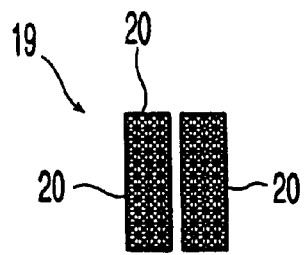
FIG. 9 is an illustration of a first embodiment of a magnetic coil for use in the present inventions.
Figure 10:
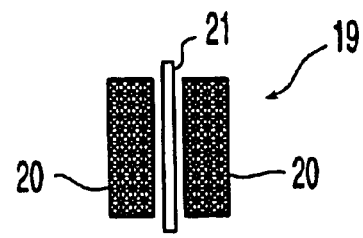
FIG. 10 is an illustration of a second embodiment of a magnetic coil.
Figure 11:
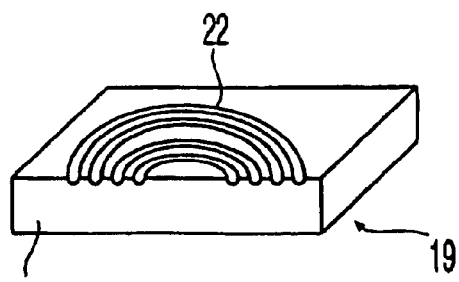
FIG. 11 is an illustration of a third embodiment of a magnetic coil.
Figure 12:
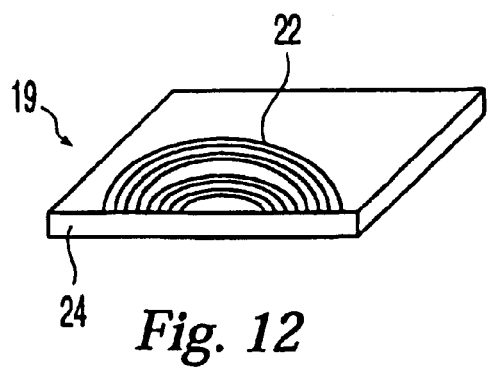
FIG. 12 is an illustration of a fourth embodiment of a magnetic coil.

As is shown in FIGS. 9–12, various types of magnetic coils 19 are possible. FIG. 9 illustrates a basic or simple coil made of a plurality of windings 20. In FIG. 10, a ferromagnetic core 21 is added to the plurality of windings, increasing the strength of the induced magnetic field. In the embodiment shown in FIG. 11, a coil of conductive material 22 is defined on the surface of a silicone chip 23, and in FIG. 12, the coil of conductive material 22 is printed on the surface of a circuit board substrate 24.

Figure 13:
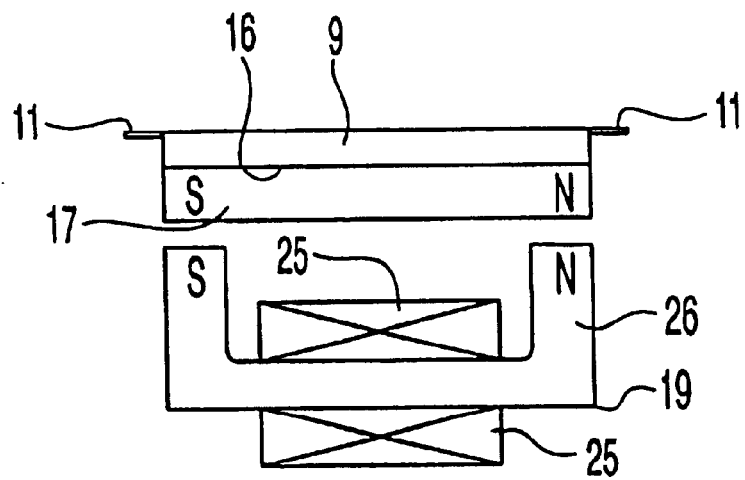
FIG. 13 is a schematic of the mirror and an electromagnet having a first polarity.
Figure 14:
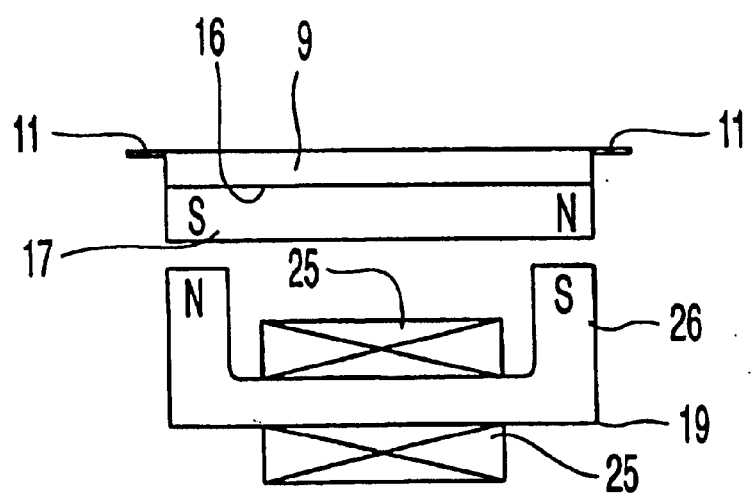
FIG. 14 is a schematic of the mirror and the electromagnet having a second polarity.

In a second embodiment of the MEM mirror of the present invention, as is best shown in FIGS. 13 and 14, the layer of magnetic material 17 is polarized in a direction that is parallel to the bottom surface 16 of the mirror 9. In this embodiment, the magnetic coils 19 are electromagnets having a coil portion 25 wrapped around a ferromagnetic yolk 26. As in the first embodiment, the magnetic coil 19 may be polarized to either push or pull the mirror 9 according to the applied current. In FIG. 13, the induced magnetic field on both poles of the coil 19 is pushing the mirror 9. In FIG. 14, the induced magnetic field on both poles of the coil 19 is pulling the mirror 9.

In this second embodiment when the mirror is pushed by the electromagnetic coils 19, stable positioning in any desired position between the extreme positions is achieved. The electromagnetic force acts against the hinge flexure force, and a better positioning stability is achieved by applying two opposing push forces at the same time. In addition, the magnetic circuit of the second embodiment contains more ferromagnetic material, i.e. less air or void space, compared to the magnetic circuits of the first embodiment. The result of the increased amount of ferromagnetic material is an increase in the resulting magnetic forces. Therefore, less electric current is needed in the second embodiment to drive the mirror.

Figure 15:
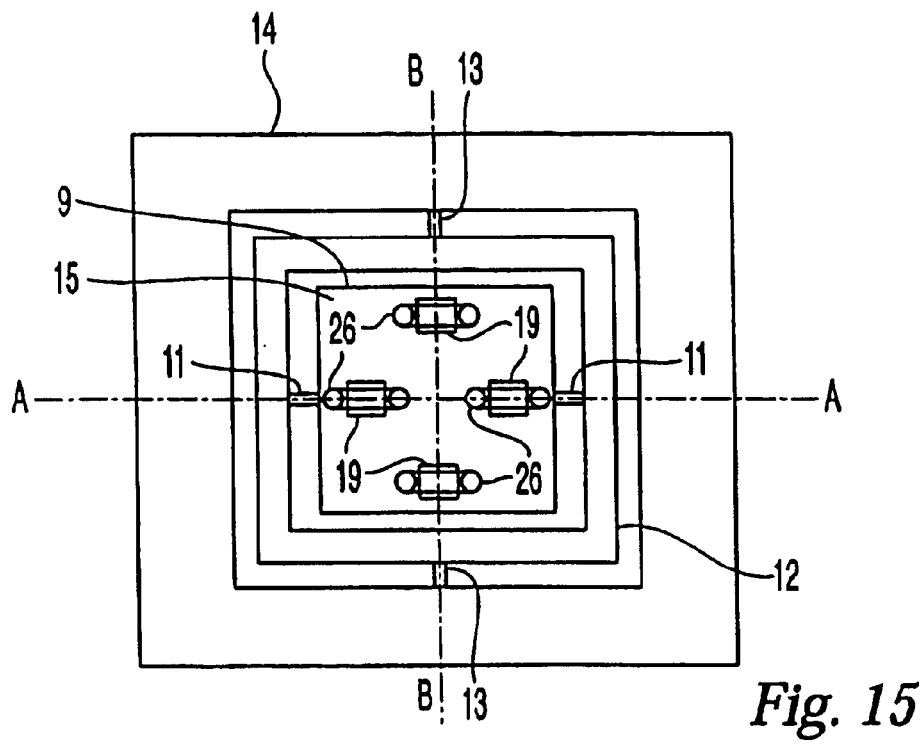
FIG. 15 is a plan view of the moveable mirror showing an arrangement of the electromagnets.
Figure 16:
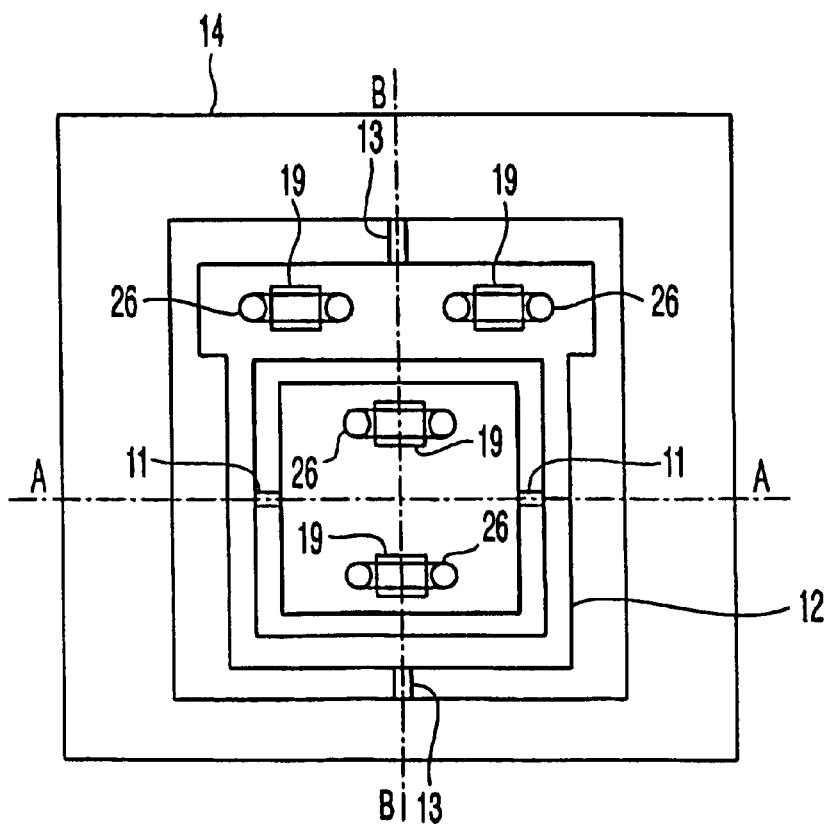
FIG. 16 is a plan view of the moveable mirror showing another arrangement of the electromagnets.

FIGS. 15 and 16 illustrate two possible arrangements for the magnetic coils 19 in the second embodiment. These arrangements, similar to the coil arrangements of the first embodiment, achieve two controlled axes. Although the ferromagnetic yolks 26 may be oriented in any of a number of positions, preferably the ferromagnetic yolks 26 are aligned in the same direction. As illustrated, this direction is generally parallel to the first axis of rotation A. The benefit of such an alignment is that polarizing the magnetic material 17 on the mirror 9 or the gimbal frame 12 yields a magnetic field in one direction.

Figure 17:
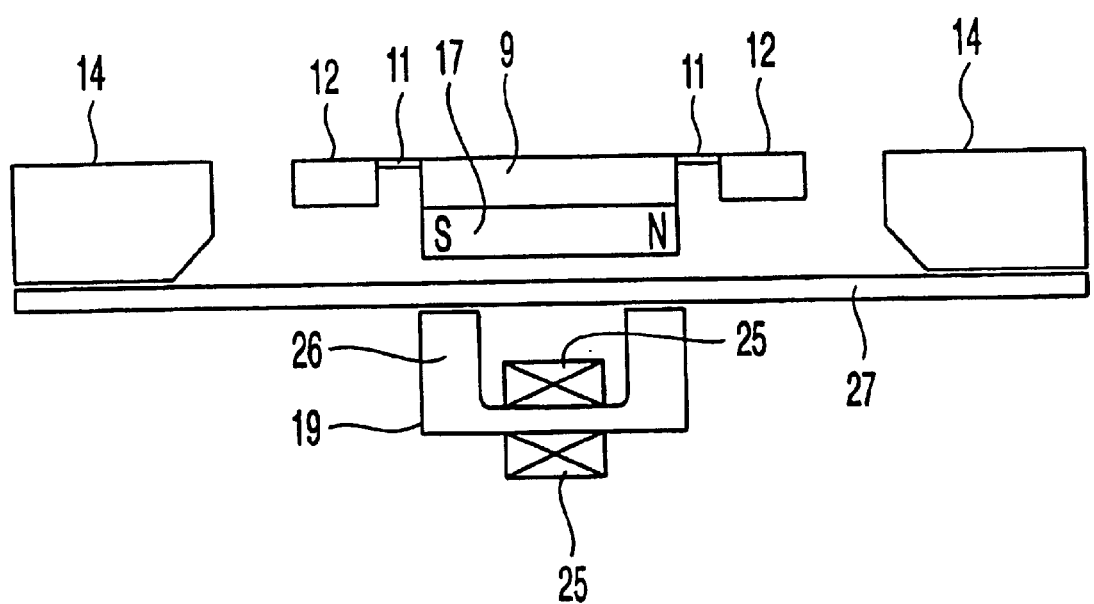

Referring to FIG. 17, a damping mechanism 27 may be added to provide for better servo control of the MEM built mirror. Preferably, the damping mechanism 27 is a piece of electrical conductive material placed between the magnetic coils 19 and the magnetic material 17 of the mirror 9. Any movement of the mirror 9 will create a change in the magnetic flux, thereby creating eddy-currents in the conducting material of the damping mechanism 27. These eddy-currents convert electrical energy to heat, resisting the movement of the mirror 9. Suitable materials for the damping mechanism include aluminum and copper.

Figure 18:
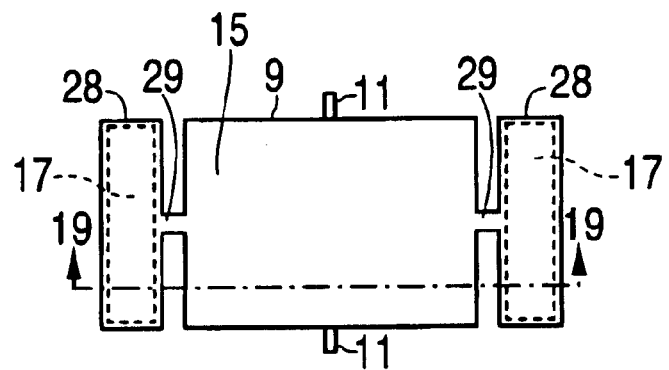
FIG. 18 is a plan view of the mirror with a first type of wing structure.
Figure 19:
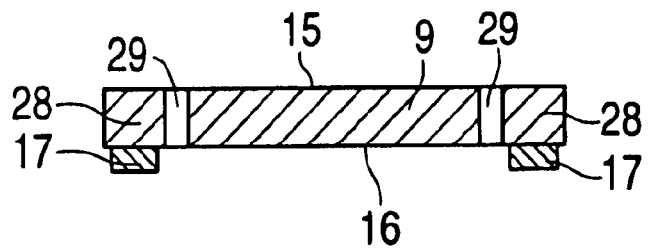
FIG. 19 is a view through line 19—19 of FIG. 18.
Figure 20:
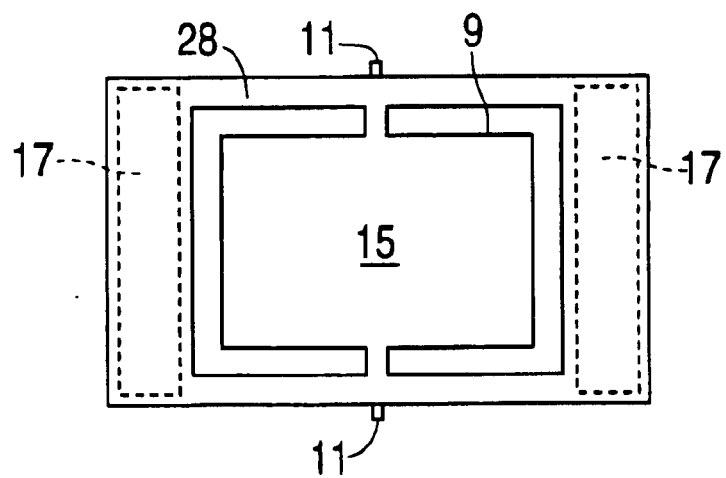
FIG. 20 is a plan view of the mirror with a second type of wing structure.

Since the mirror 9 and gimbal frame 12 are preferably constructed of silicon, and the magnetic material 17 or permalloys used to coat the mirror 9 and gimbal frame 12 have different thermal coefficients of expansion then silicon, the mirror 9 and the gimbal frame 12 may experience bending with temperature changes. As is best shown in FIGS. 18–20, additional structures or wings 28 can be added to the mirror 9 to isolate the mirror 9 from any distortions due to differences in coefficients of thermal expansion. The magnetic material 17 would only be coated onto the wings 28. Therefore, even though the wings may bend or distort, the reflective top face 15 of the mirror 9 will be influenced little if at all.

Figure 21:
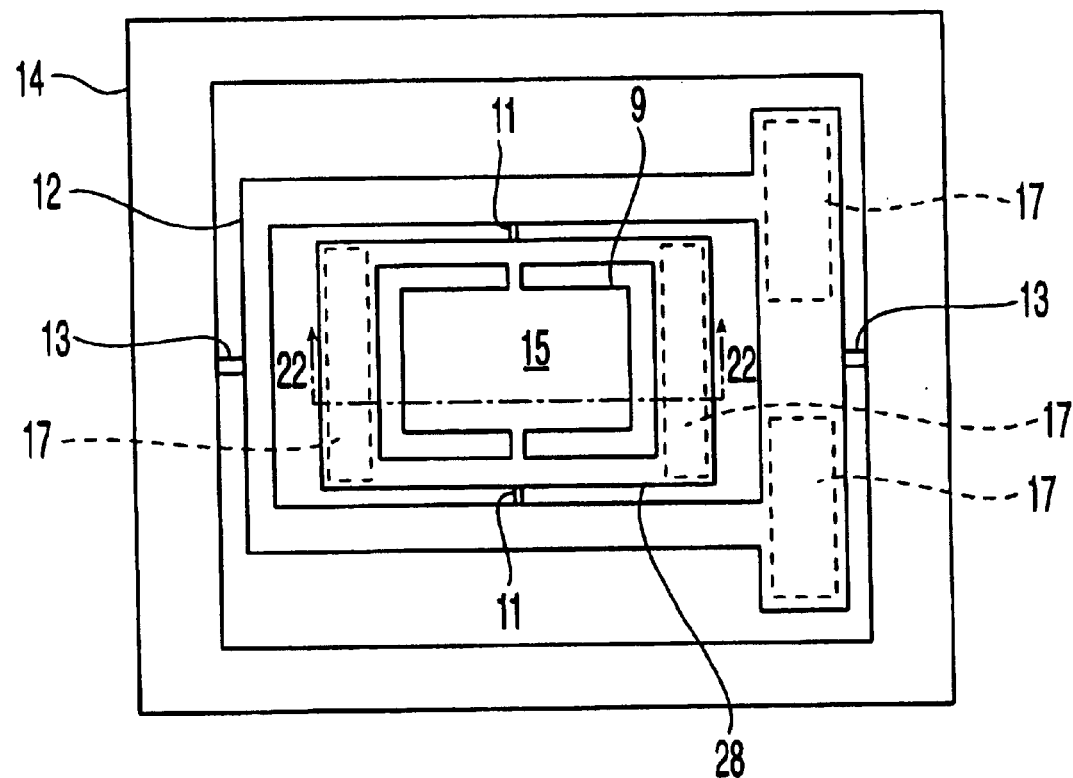
FIG. 21 is a plan view of the mirror with the second type of winged structure and an expanded gimbal.

Since the rotational force applied by the wings 28 to the mirror 9 can be strong enough to bend the wing attachment member 29, a preferred embodiment of the wing 28 avoids this problem. Such a suitable arrangement is illustrated in FIG. 20. FIG. 21 illustrates this embodiment within a gimbal frame 12 containing magnetic material 17. Again, the gimbal frame 17 is enlarged in the area of the magnetic material 17 to accommodate the magnetic coils 19 having the ferromagnetic yolks 26.

Figure 22:
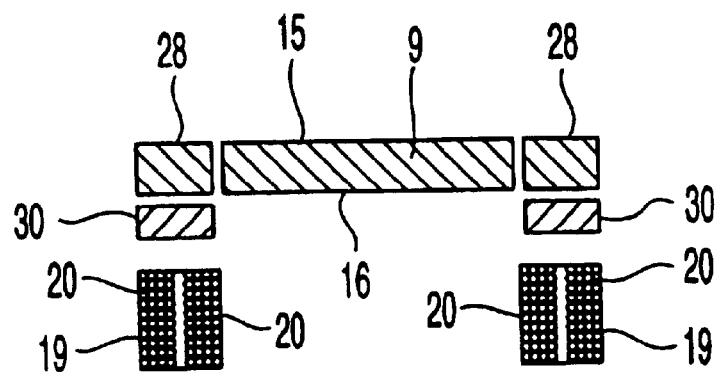
FIG. 22 is a view through line 22—22 of FIG. 21.
Figure 22A:
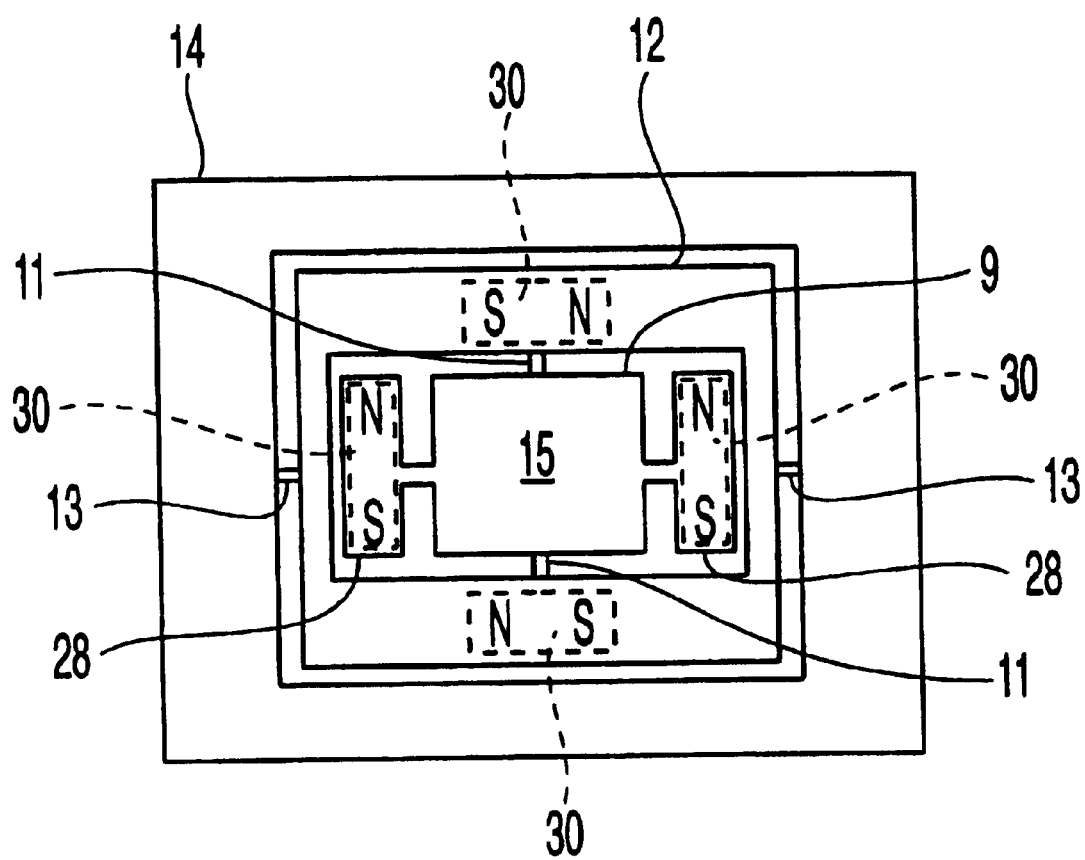
FIG. 22A is a plan view of the mirror with the first type of wing structure and gimbal and indicating magnetic polarity.

Referring to FIG. 22, permanent magnets 30 may be attached to the gimbal frame 12 or bottom 16 of the mirror 9 instead of ferromagnetic material 17 to increase the applied forces. The polarization of the permanent magnets 30 may be either perpendicular to the bottom face 16 or parallel to the bottom face 16. The magnetic coils 19 would then be aligned accordingly. In the case of the permanent magnets 30 being aligned parallel to the bottom face 16, a possible arrangement of these magnets 30 on the mirror 9 and gimbal frame 12 is illustrated in FIG. 22A.

Although pulling of the mirror is preferred when using magnetic coils 19 and magnetic material 17, when using permanent magnets 30, pushing and pulling of the mirror 9 can be used. Simply changing the direction of the current in the magnetic coils, i.e. changing the polarity, permits switching between pulling and pushing.

Figure 23:
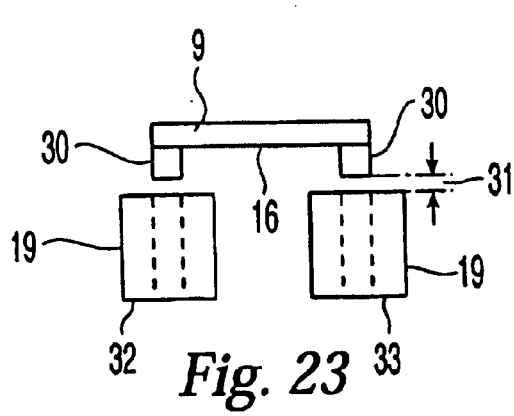
FIG. 23 is a schematic view of the mirror and magnetic coils in a rest position.
Figure 24:
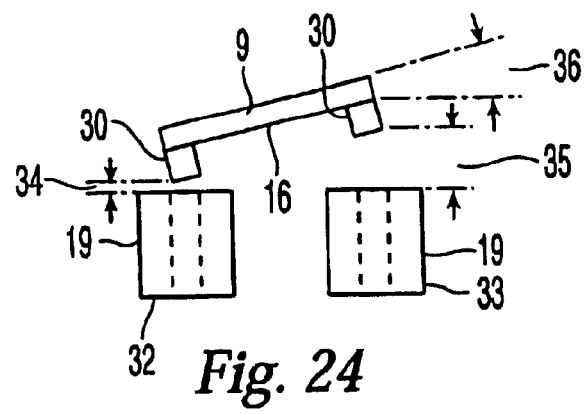
FIG. 24 is a schematic view of the mirror and magnetic coils in a second position.
Figure 25:
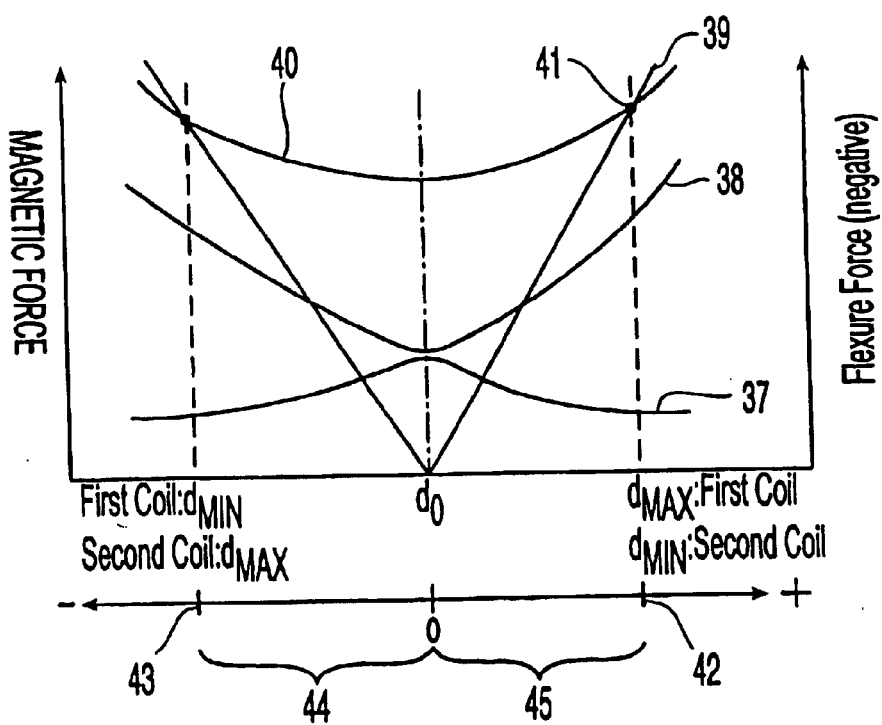
FIG. 25 is a graph of the forces versus distance for FIGS. 23 and 24; F

Referring to FIGS. 23–25, permanent magnets 30 are attached to the mirror 9 and are polarized in a direction perpendicular to the bottom face 16 of the mirror 9. FIG. 23 illustrates the rest position of the mirror 9 wherein the rest distance 31 between the magnets 30 and first and second magnetic coils 32,33 is $d_0$. As currents are applied to the first and second coils 32,33, the mirror 9 will rotate until it reaches the position shown in FIG. 24. In this position, the distance 34 between the first magnetic coil 32 and the magnet 30 is a minimum, $d_{min}$, and the distance 35 between the second magnetic coil 33 and the magnet 30 is $d_{max}$.

The mirror has moved through an angle of rotation 36 that is positive when the mirror 9 rotates counter-clockwise, and negative when the mirror rotates clockwise. In order to cause a positive angle of rotation 36, the first coil 32 is driven to attract the mirror 9, and the second coil 33 is driven to repel the mirror 9. Conversely in order to cause a negative angle of rotation 36, the first coil 32 is driven to repel the mirror 9, and the second coil 33 is driven to attract the mirror 9.

FIG. 25 provides a graph of magnetic forces and flexure forces vs. mirror position, d. For purposes of clarity, the push curve 37 is separated from the pull curve 38, although these curves may in fact cross one another. The resultant push/pull curve 40 magnetic force is more linear, and the combined push/pull force is larger than either one of the push or pull forces. A curve 39 for the spring force, which is in fact the flexure force of the hinges, is also provided. The flexure force is a linear force that resists the rotation of the mirror, i.e. the flexure force is negative. The crossing point 41 between the flexure force curve 39 and the push/pull curve 40 is the working position.

The graph in FIG. 25 includes a line illustrating the value of the angle of rotation 36 from the maximum angle of rotation 42 to the minimum angle of rotation 43. This line also illustrates the negative angles of rotation 44 when the first coil 32 is driven to repel the mirror 9, and the second coil 33 is driven to attract the mirror and the positive angles of rotation 45 when the first coil 32 is driven to attract the mirror 9, and the second coil 33 is driven to repel the mirror 9.

Figure 26:
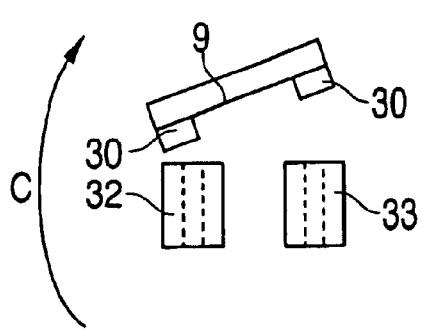
FIG. 26 is a schematic of the mirror and magnetic coil in a first position.
Figure 27:
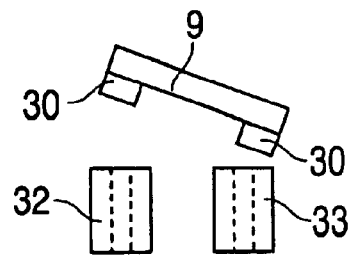
FIG. 27 is a schematic of the mirror and magnetic coil in a second position.
Figure 28:
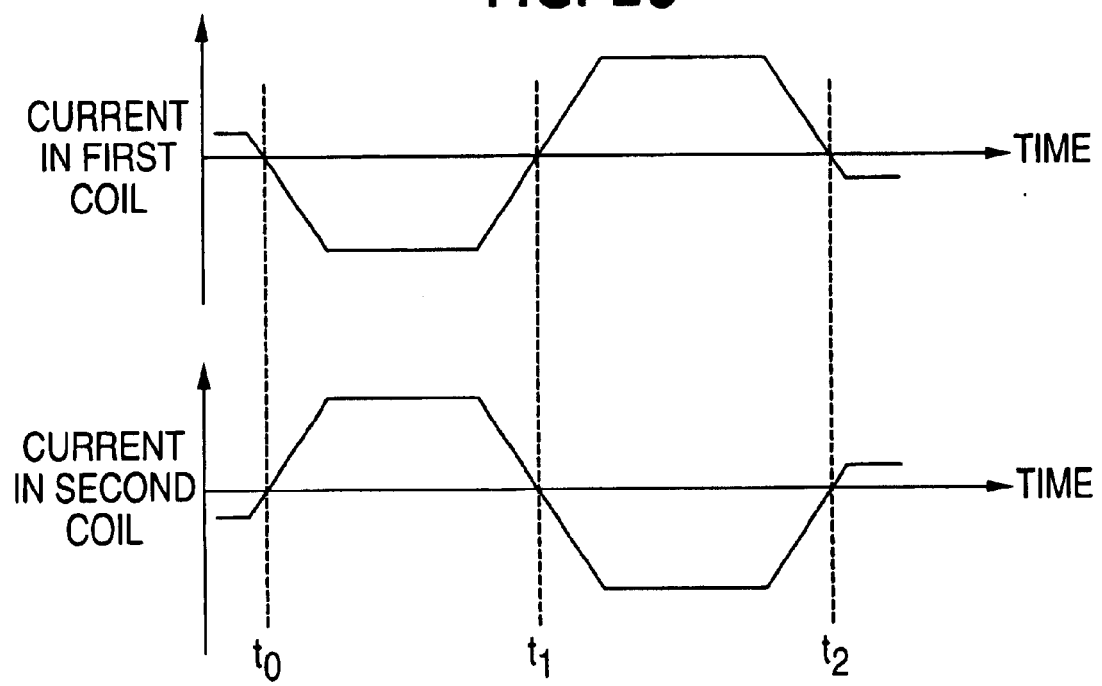
FIG. 28 is a graph of electric current versus time for FIGS. 26 and 27.

FIGS. 26–28 illustrate when a MEM built mirror with permanent magnets 30 attached to the mirror portion 9 is rotated from one position to another, sometimes referred to as mirror "jump". In FIG. 26, the mirror 9 is in a start position having a positive angle of rotation 36. The first magnetic coil 32 is pulling the mirror 9, and the second magnetic coil 33 is pushing the mirror 9. At a selected time, $t_0$, as illustrated in the graph in FIG. 28, the current in the first coil 32 is adjusted to cause the first coil 32 to begin to push the mirror 9, and the current in the second coil 33 is adjusted to cause the second coil 33 to begin to pull the mirror 9. This change causes the mirror 9 to begin to rotate clockwise in the direction of arrow C. At time $t_1$ the mirror 9 reaches its maximum speed of rotation, and the angle of rotation 36 zero. At this point, as illustrated in FIG. 28, the current in the first and second coils is zero, and both coils are spaced from the magnetic materials 17 at the rest distance $d_0$. In order to slow down and stop the rotation of the mirror, the currents in the first and second coils are reversed. At time $t_2$, the mirror 9 has reached the desired angle of rotation shown in FIG. 27, and the rotational velocity of the mirror is zeroed. At this point, the currents in the magnetic coils are adjusted to hold the mirror 9 in this position.

Figure 29:
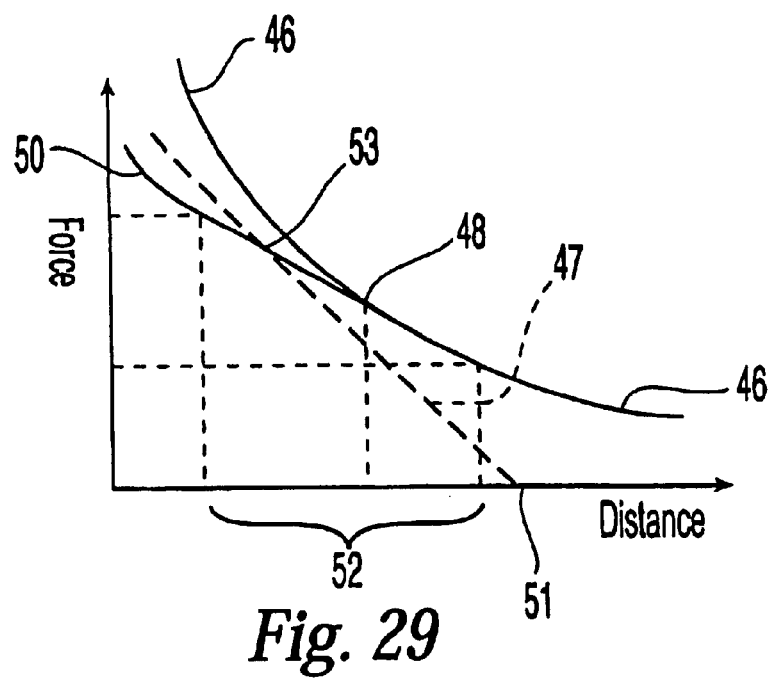
FIG. 29 is a graph of force versus distance for a magnetic coil and Permalloy.
Figure 30:
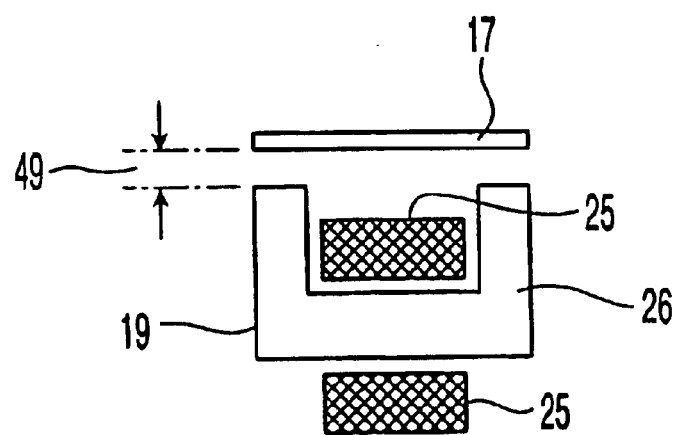
FIG. 30 is a schematic of a thin magnetic material and electromagnet.

Referring to FIGS. 29 and 30, the MEM built mirror can be modified to avoid the situation where the magnetic material 17 and the magnetic coils 19 come into contact with each other and latch-up, which is a possibility in systems using magnetic materials or electromagnets and soft ferromagnetic materials (Permalloy). FIG. 29 is a graph of force between the magnet material 17 and the magnetic coils 19 versus distance between the two for the MEM built mirror of the present invention. A standard-arrangement pull force curve 46 for a selected magnetic coil 19 is very steep at small distances between the magnetic material 17 and the magnetic coil 19. The flexure or spring force curve 47 is shown as a dashed line intersecting the distance axis at the resting position 51, $d_0$. Since the pull force curve 46 and the flexure force curve 47 as shown do not intersect, no stable point exists, and upon application of current to the magnet coils 19, the magnetic material 17 will rotate until the two come into contact. In order to cause the forces to operate linearly, the flexure force could be made significantly stronger, with the flexure force curve crossing the pull force curve at only one point. This modification, however, minimizes the possible range of movement to about 20% to 25% of the distance between the magnetic coils 19 and the magnetic material 17.

Preferably, as is best shown in FIG. 30, a piece or slab of magnetic material or Permalloy 17 having a relatively small cross section and selected to have a magnetic saturation point 48 at certain spacings 49 from the magnetic coil 19 is used. Since the magnetic material 17 is located closer to the magnetic coil 19 than the selected saturation point, the magnetic force induced between the magnetic coil 19 and the magnetic material 17 will increase at a slower rate, producing a less steep magnetic force curve 50. This less steep magnetic force curve 50 will include a quasi-linear region 52 that intersects the flexure force curve 47 at a working point 53. As the two curves now intersect, stable operation is possible at smaller spacing distances between the magnetic coils 19 and the magnetic material 17, making more of the available spacing usable.

The MEM mirror can be used in any optical system requiring the switching of light from one or more inputs to one or more outputs. Such systems include fiber-to-fiber switches, and the optical switches may be combined with other optical equipment including lenses for focusing and collimating. In a preferred embodiment, the MEMS switches are combined with optical storage devices. Optical storage devices are used to optically read and write information from and onto a number of optical disks. The present invention uses at least one moveable mirror, preferably two moveable mirrors, to selectively guide a light beam from one or more light sources to one of the optical disks.

Figure 31:
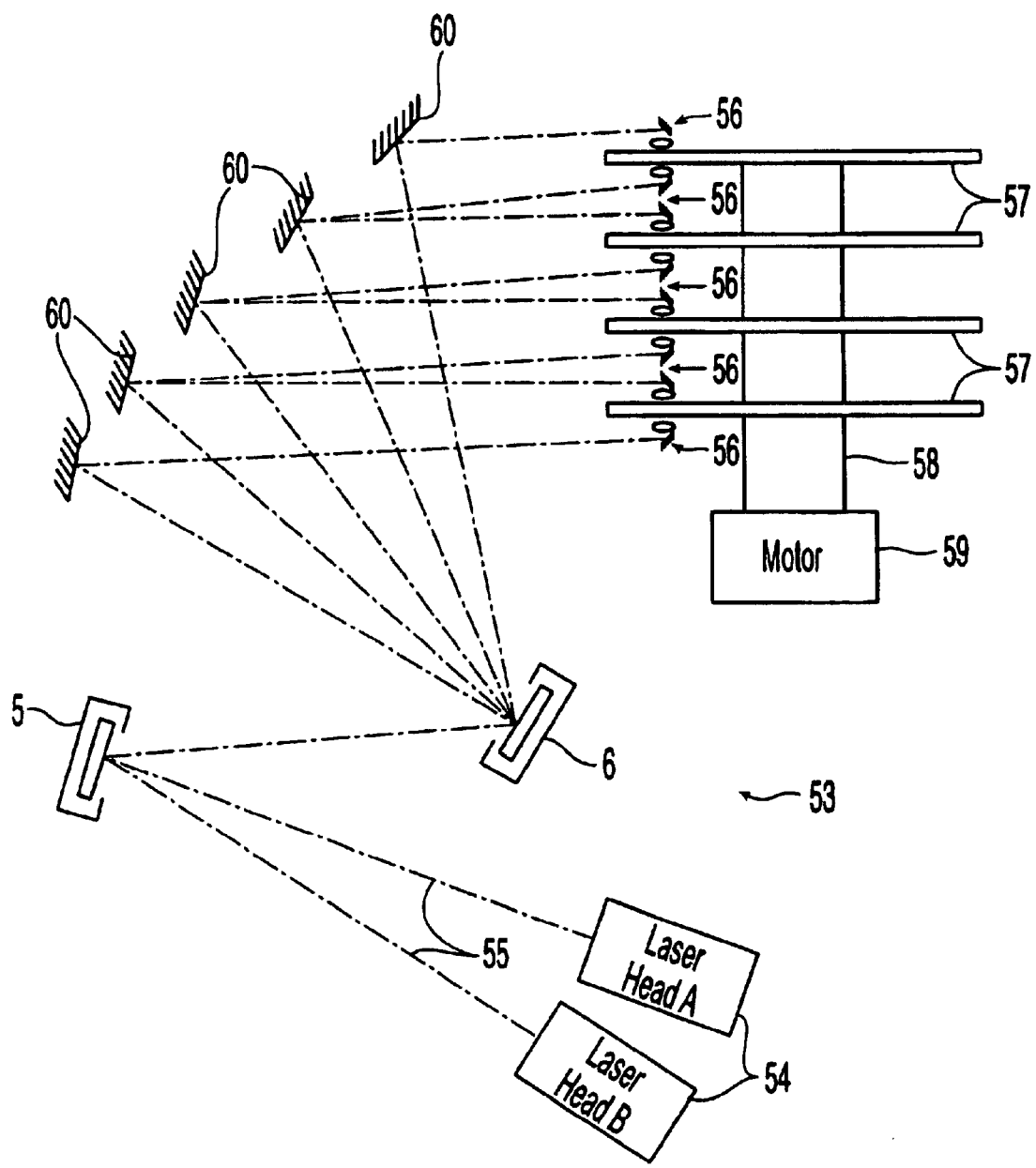
FIG. 31 is a diagrammatic perspective view of a preferred embodiment of an optical switching apparatus in accordance with the principles of the present invention.

Referring to FIG. 31, an optical switching apparatus for optical disk drives according to the present invention is shown. The optical disk drive 53 includes one or more light sources such as a laser module 54 having a laser source and other components required to produce a laser beam 55. It should be noted that the optical switching apparatus of the present invention can be used with any number of laser modules 54. The need for using more than one laser sources, each laser source having different optical properties, may arise. For example, one laser source may be specifically configured for writing operations while another laser source is configured for reading operations.

The optical disk drive 53 includes a number of read/write (R/W) head members 56, each of which is associated with a surface of at least one of the optical disks 57. The optical disks 57 are arranged spaced axially from each other and supported on a spindle 58 rotatable by means of a drive motor 59. The optical disks 57 may have either one or two recordable sides. Information or data are stored in tracks formed on the reflective surfaces of the optical disks 57. The read/write head members 56 are capable of moving radially across the disk to selected track areas of the optical disks, e.g., linearly or arcuately with respect to the disk.

The optical switch 1 included in the optical disk drive 53 includes first and second moveable mirrors 5, 6 for selectively coupling a laser beam from one of the laser modules 54 to a selected head member 56. The optical path begins at one of the laser modules. The light beam 55 emitted by one of the laser modules impinges upon the first moveable mirror 5. The angle of the first moveable mirror 5 may be changed in order to switch between the laser modules. The first moveable mirror 5 guides the light beam from the light sources to a specific location on the second moveable mirror 6. This specific location may vary as described below. Once the beam reaches the second moveable mirror 6, the beam is directed to one of stationary mirrors 60. The positions of the first and second moveable mirrors 5, 6 are precisely adjusted to enable the light beam to be switched from one optical disk to another optical disk.

The moveable mirrors 5, 6 have a reflective surface which is adjustable about at least one pivot axis and preferably about two pivot axes. The orientation of the reflective surface is controlled by a control mechanism. The control mechanism precisely controls the degree of rotation of the reflective surface in one or both pivot axes. The movements of the first and second moveable mirrors 5, 6 are coordinated by a processor to selectively switch the direction of the laser beam between different optical disks. The moveable mirror can be of any suitable type capable of enabling the light beam to be rapidly and accurately guided to a precise position as required by the optical disk drive. Preferably, the moveable mirror may be the optical switching mirror described above and disclosed in U.S. provisional patent application Ser. No. 60/088,239 filed Jun. 5, 1999 which is incorporated herein by reference.

Also included in the illustrated optical switching apparatus is a number of stationary mirrors 60. Each stationary mirror is associated with one of the R/W head members 56. The stationary mirrors 60 have reflective surfaces, each oriented at a predetermined pivotal angle, to deflect the light beam from the second moveable mirror 6 to the respective head members 56. In use, the second moveable mirror 6 aims the light beam to one of the stationary mirrors 60. The stationary mirror then reflects the beam arriving onto it to a respective R/W head member 56. The locations of the stationary mirrors 60 are selected in such away as to keep the optical path length from the laser sources 54 to the R/W heads 56 as constant as possible.

Figure 32:
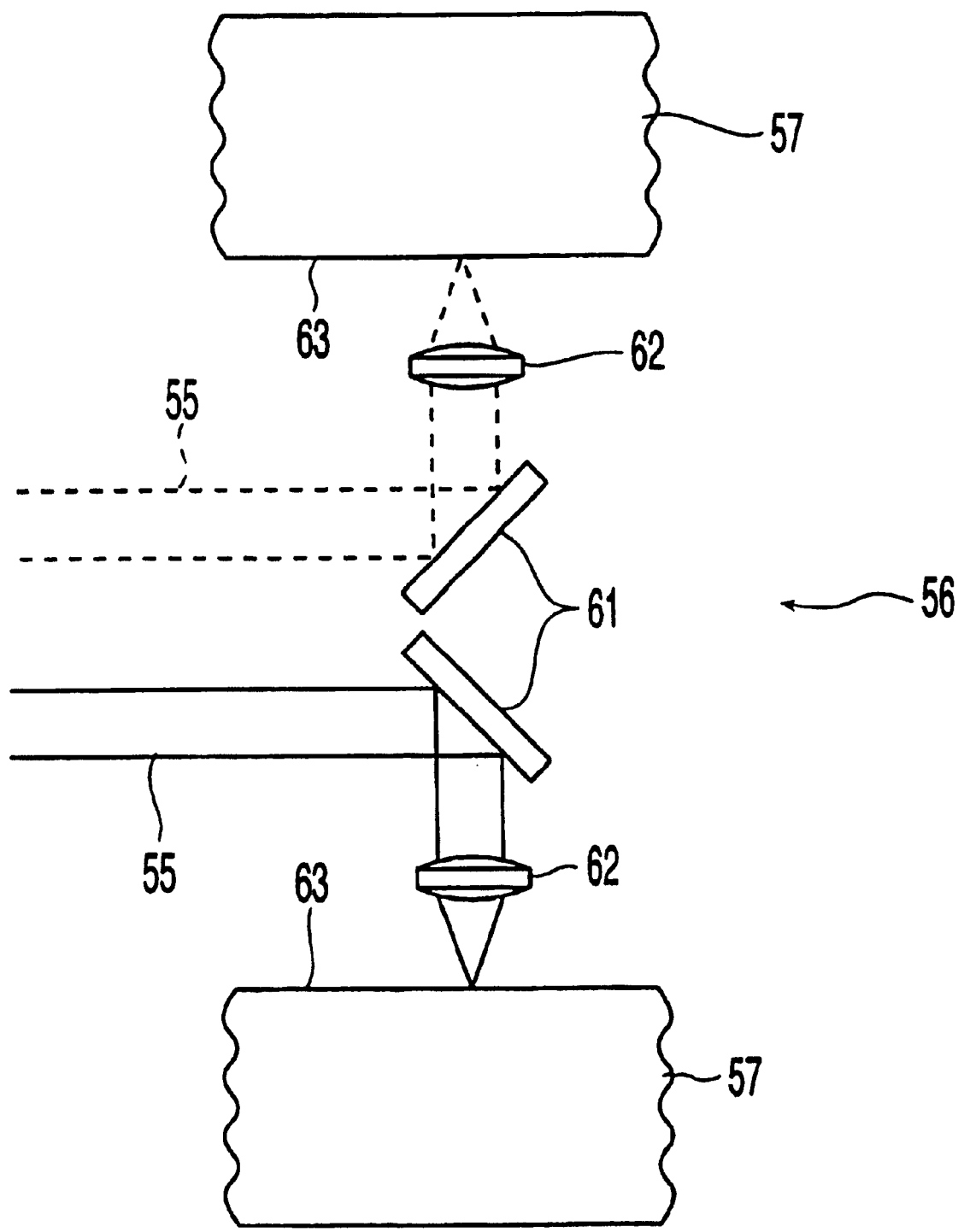
FIG. 32 is an enlarged side elevational view of a read/write head located between two optical disks, illustrating mirrors positioned to reflect light beams to a respective lens through which the light beams become focused onto the respective disk.

Referring to FIG. 32, the read/write heads 56 include at least one head mirror 61 to receive the light beam 55 from one of the stationary mirrors. An R/W objective lens 62 is located between the head mirror 61 and a respective optical disk surface 63 to focus the beam reflected by the head mirror onto a selected track of the optical media 57. The beam is preferably aimed into the center of the R/W objective lens 62, and the angle of the beam at which the beam passes through the R/W objective lens will determine focusing and tracking operations, as described below. The beam reflected from the surface of the optical disk 57 is monitored by a signal detector to information stored on recording surfaces of disks.

Each read/write head 56 may include one or two sets of a head mirror and an R/W objective lens. One set will enable read/write operations on one surface, and two sets will enable reading/writing operations on two surfaces, for example, one surface above the R/W head and another surface below the R/W head. As seen by referring to FIGS. 31 and 32, the read/write heads 56 located between two adjacent optical disks 57 have two sets of a head mirror and an R/W objective lens. Such read/write heads are capable of reading and writing data of two facing sides of adjacent disks, for example, the bottom side of the upper disk and the top side of the lower disk. The incoming beam from one of the stationary mirrors 60 is directed onto one of the head mirrors 61 for purposes of performing read/write operations on one of the optical platters 57. It should be noted that use of one stationary mirror 60 to aim the beam to two R/W objective lenses 62 in the same R/W head member 56 may require increasing the size of the second active mirror 6 by more than two fold. In order to avoid this situation, it may be desirable to provide a separate stationary mirror assigned to each of the R/W objective lenses.

Figure 33:
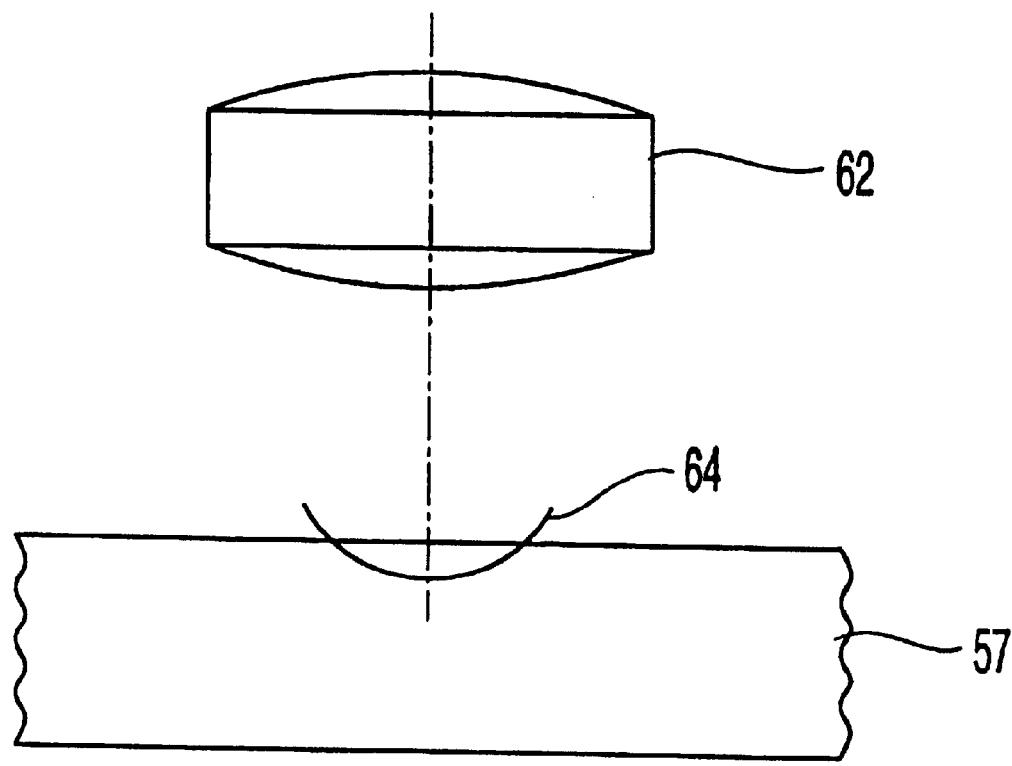
FIG. 33 is an enlarged side elevational view of an R/W objective lens positioned with respect to the optical disk, illustrating a spherical focal plane of the R/W objective lens.

As is shown in FIG. 33, the focal plane 64 of common lenses is not planar but spherical. The spherical focal plane 64 of the R/W objective lens 62 can be used for focusing the beam onto the optical platter 57. As is best shown in the view of the platter surface from the vantage point of the lens in FIG. 34, the circles 65 illustrate the best focus contours for different locations of the optical disk surface relative to the lens. The shallow arcs 66 indicate the different R/W tracks on the optical platter. The highlighted area is useful to reach several tracks in a range of focus conditions. It is possible to reach different points in this area by making the light beam arrive at the lens from different directions.

Figure 34:
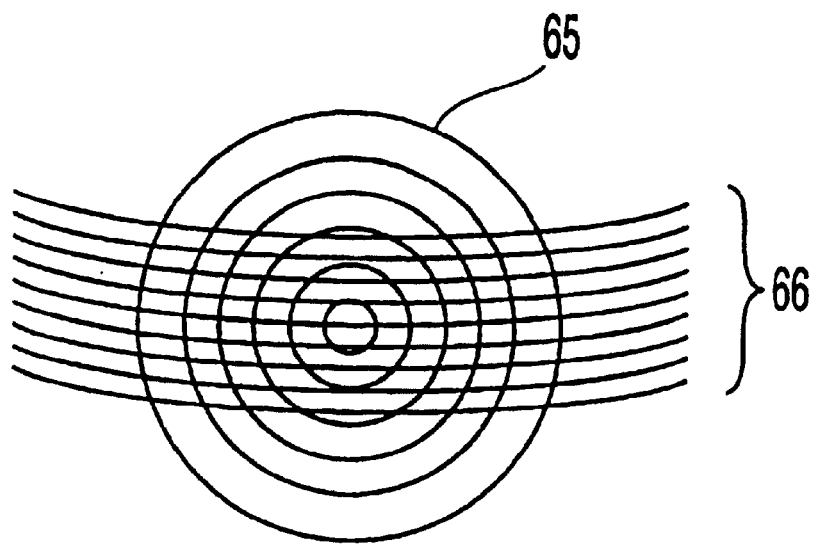
FIG. 34 is a plan view showing a portion of tracks on the disk surface in relation to focus circles representing a range of various focus conditions.
Figure 35:
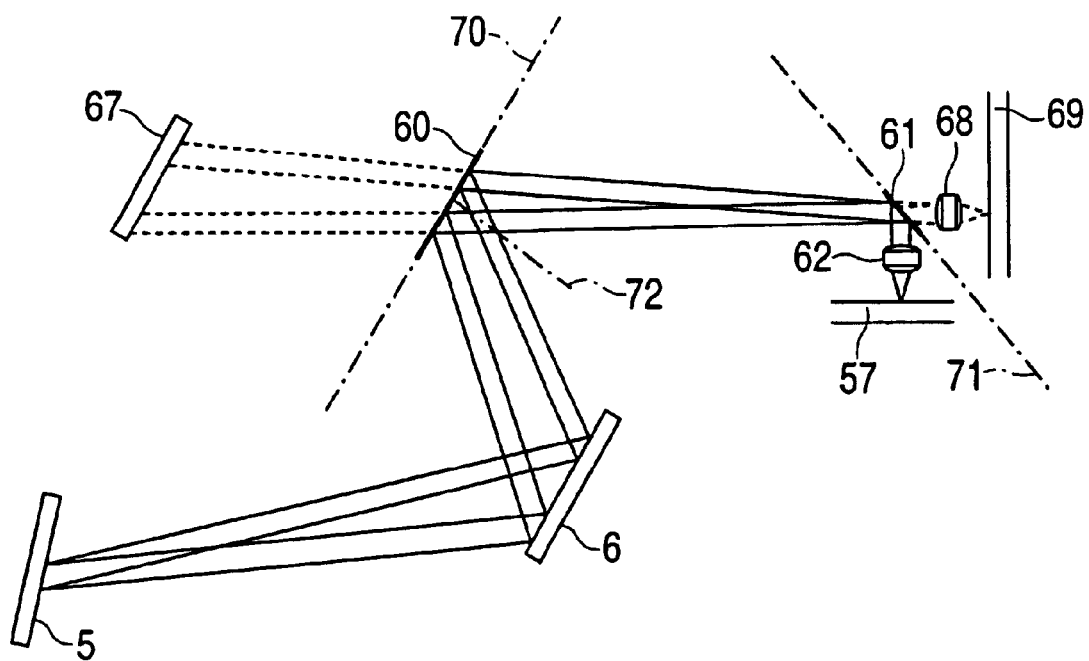
FIG. 35 is a diagrammatic perspective view of a light beam, guided by the first and second moveable mirrors and reflected by a selected one of the stationary mirror and a head mirror, being directed into the R/W objective lens.

Referring to FIG. 35, the second moveable mirror 6 is shown as the stationary mirror 60 images it, designated as 67. The R/W objective lens 62 is shown as imaged by the head mirror 61, designated as 68. Only one optical platter 57 is shown having its image designated as 69. The stationary mirror 60 defines a stationary mirror plane 70 having a normal line 72, and the head mirror 61 defines a head mirror plane 71. By directing the beam onto different locations on the second moveable mirror 6, the beam may arrive into the R/W objective lens 62 from different directions, i.e. via different spots on the stationary mirror 60. The positioning of the beam on the second active mirror 6 in one dimension will control mainly tracking, while the other dimension will control mainly focus, although some interaction between the two degrees of freedom exists, as seen in FIG. 34.

The second moveable mirror 6 is preferably sufficiently sized so that all required spots on it are available. For purposes of compensating for possible misalignments in the stationary mirrors 60, a slightly larger size of the second moveable mirror may be desirable. In order to avoid creating a need for excessively large second moveable mirror, the R/W head members 56 are preferably configured such that they move linearly with respect to the stationary mirrors. If the R/W head members 56 move along an arc or radially with respect to the disk 57, a larger sized second moveable mirror 6 and larger sized stationary mirrors 60 are required. The distance from the second moveable mirror to the R/W objective lenses is preferably minimized in order to minimize the size of the second moveable mirror.

Figure 36:
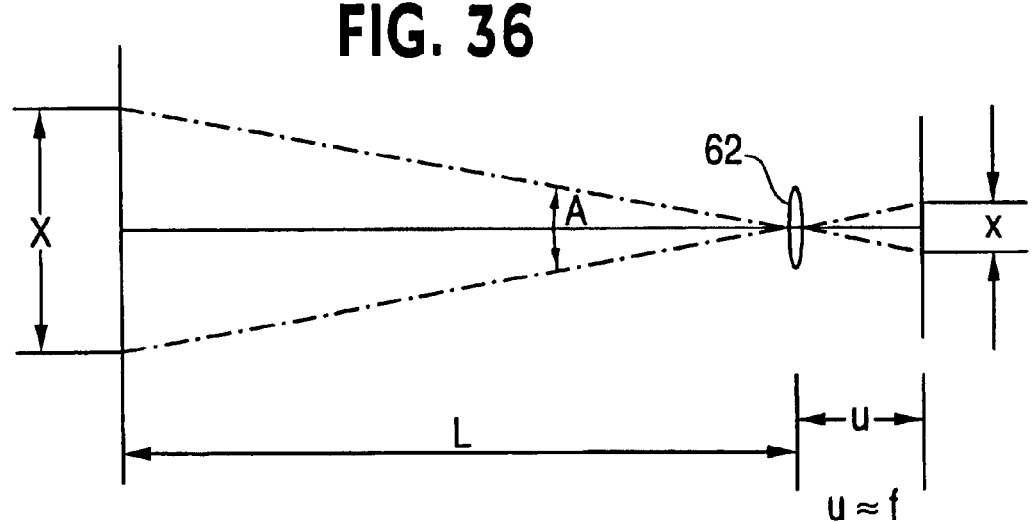
FIG. 36 is a diagram illustrating optics of the present invention.

Referring to FIG. 36, the R/W objective lens 62 is shown with the axis of the possible beams. The focal length of the lens is represented by u, and the diameter of the target area on the platter is represented by x. The size of the second moveable mirror 6 is represented by X, and the distance between the second moveable mirror 6 and the R/W objective lens 62 is represented by L. Assuming that the focal length (u) of the lens 62 is 1 mm, that the separation between the tracks is 1 micron, and that 10 tracks should be addressable, the different arriving angles for track control should be:

$$A = x/u = 10*10^{-6}/1*10^{-3} = 10*10^3 \text{ Radians}$$

Although the platter-lens distance should be different from the focal length u, the two were approximated as equal for the purposes of this calculation. This approximation introduces an error of less than 1% in the final result. In addition, small angles and thin lenses are approximated.

If the optical path distance L between the second moveable mirror 6 and the R/W objective lens 62 is 100 mm (0.1 m), the required beam wander on the mirror will be:

$$X = L*A = 0.1*10*10^{-3} = 1*10^{-3} \text{ m} = 1 \text{ mm}$$

Adding this dimension to a beam diameter of 1 mm yields a mirror size of 2 mm.

Figure 37:
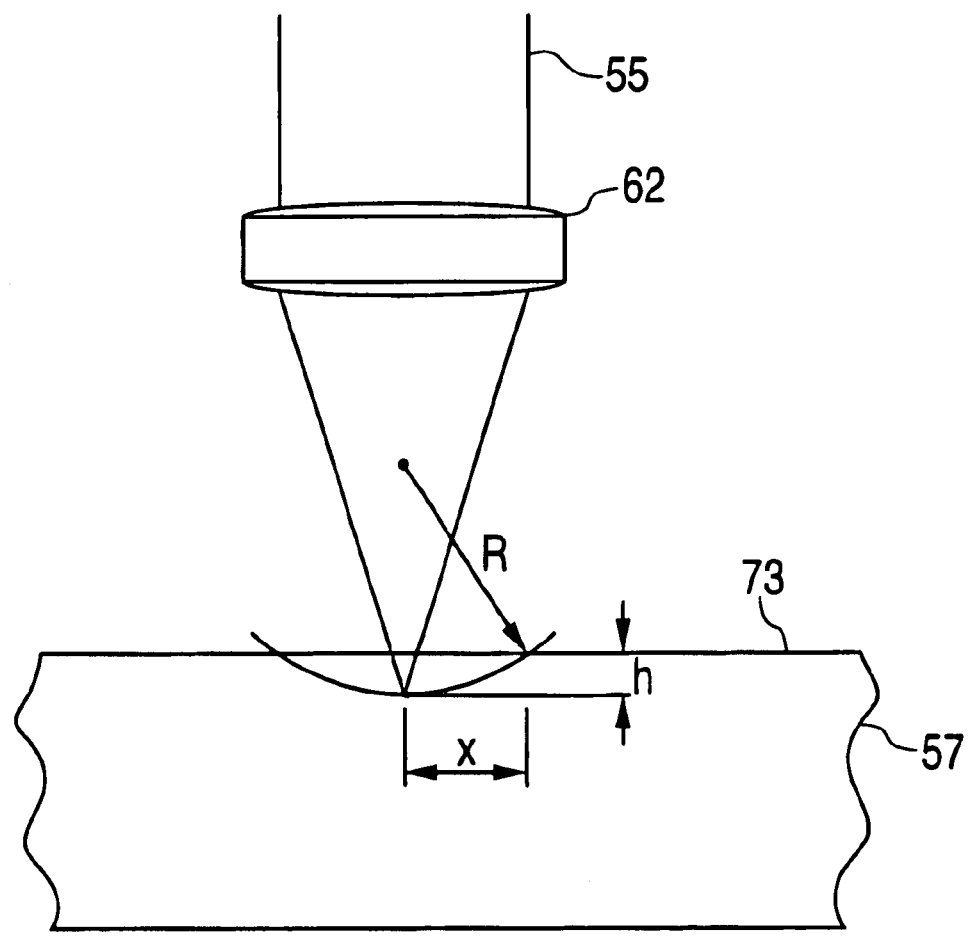
FIG. 37 is an enlarged side elevational view of the R/W objective lens focusing 30 a light beam in an optical path orthogonal to the surface of the disk.

Referring to FIG. 37, the R/W objective lens 62 is shown focusing a light beam 55 in an optical path orthogonal to the surface 73 of the optical disk 57. The focal radius of the R/W objective lens 62 is represented by R. A lens with a 1 mm focal length will have a 0.5 mm focal radius for its focal plane spherical surface. If the beam wander on the second moveable mirror 62 is also 1 mm in the dimension controlling the focus the possible, focus adjustment is:

$$h = x^2/(2*R) = (10*10^{-6})^2/(2*0.5*10^{-3}) = 1*10^{-7} \text{ m} = 0.1 \text{ micron}$$

Increasing the mirror size to 3 mm in the dimension controlling focus will increase the possible beam wander on the mirror in this dimension to 2 mm, with focus adjustment increased four times to 0.4 up.

Figure 38:
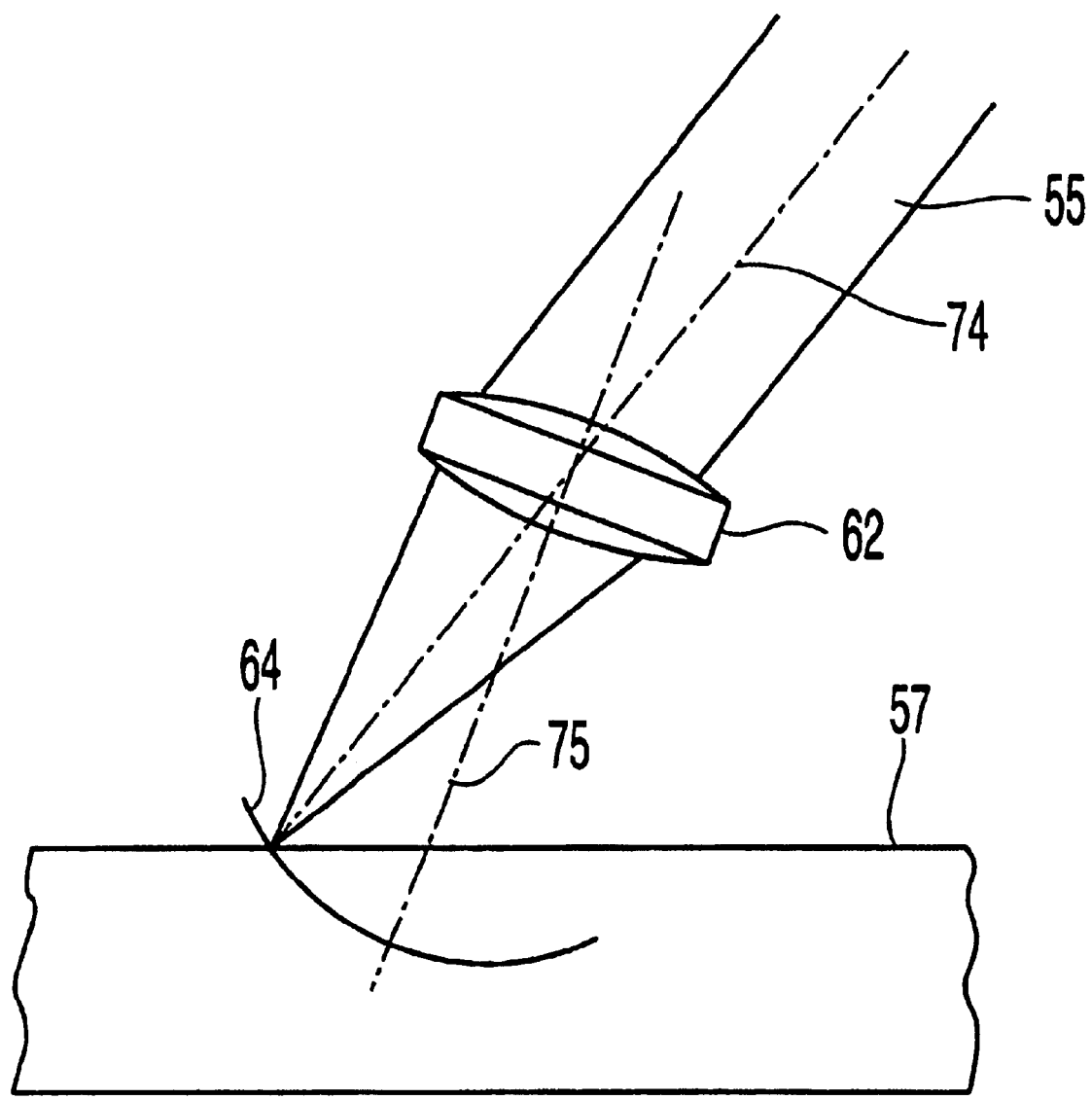
FIG. 38 is an enlarged side elevational view of the R/W objective lens being slightly tilted relative to the disk.

Referring to FIG. 38, the objective lens 62 has been slightly tilted relative to the optical disk 57, and the axis of the laser beam 74 and the axis of the lens 75 are shown in relationship to the lens 62 and the focal plane of the R/W objective lens. 64. Tilting the lens 62 relative to the platter 57 can increase the amount of possible focus adjustment. For Example, a tilt of 0.1 Radians will allow approximately 1 micron of focus adjustment with a 2 mm mirror, and 2 microns of adjustment with a 3 mm mirror.

Referring again to FIG. 31, in operation the optical disk drive of the present invention selects one of the optical disks 57, and the R/W head member 56 associated with the selected optical platter is moved to a target track area of the selected optical platter 57. The head member 56 may move either linearly or radially with respect to the optical platter 57. One of the laser modules 54 emits a light beam 55 in the direction of the first moveable mirror 5. The first moveable mirror 5 receives the laser beam 55 from the laser source 54 and aims the beam onto a specific point on the second moveable mirror 6 by changing the orientation of its reflective surface. The location of the specific point on the second moveable mirror 6 is determined according to the tracking and focusing needs. The second moveable mirror 6 is positioned to precisely guide the light beam 55 to one of the selected stationary mirrors 60 such that the beam from the stationary mirror is deflected by a head mirror 61 and guided to the center of an R/W objective lens 62 associated with the selected optical disk 57.

When the requested or required data is stored on a different optical disk 57, the processor controls the movements of the first and second moveable mirrors 5,6 to switch the beam 55 from one optical disk to another optical disk. The alignment of the first and second moveable mirrors 5, 6 will depend on the exact positioning of the selected R/W head member 56 with respect to the respective stationary mirror 60. The tracking of the optical disk 57 is possible relative to the exact position of the R/W head member 56. In order to obtain calibration parameters, a calibration of all optical parameters will be conducted by searching for the best alignment of the mirrors for each track on the optical platters. During normal operation, the calibration parameters will be used for fast positioning of the moveable mirrors 5, 6 in order to rapidly and accurately switch the beam 55 from one optical disk 57 to another. In addition, slow adjustments of the calibration parameters will be made as mechanical parameters drift due to time, temperature, and other factors.

Figure 39:
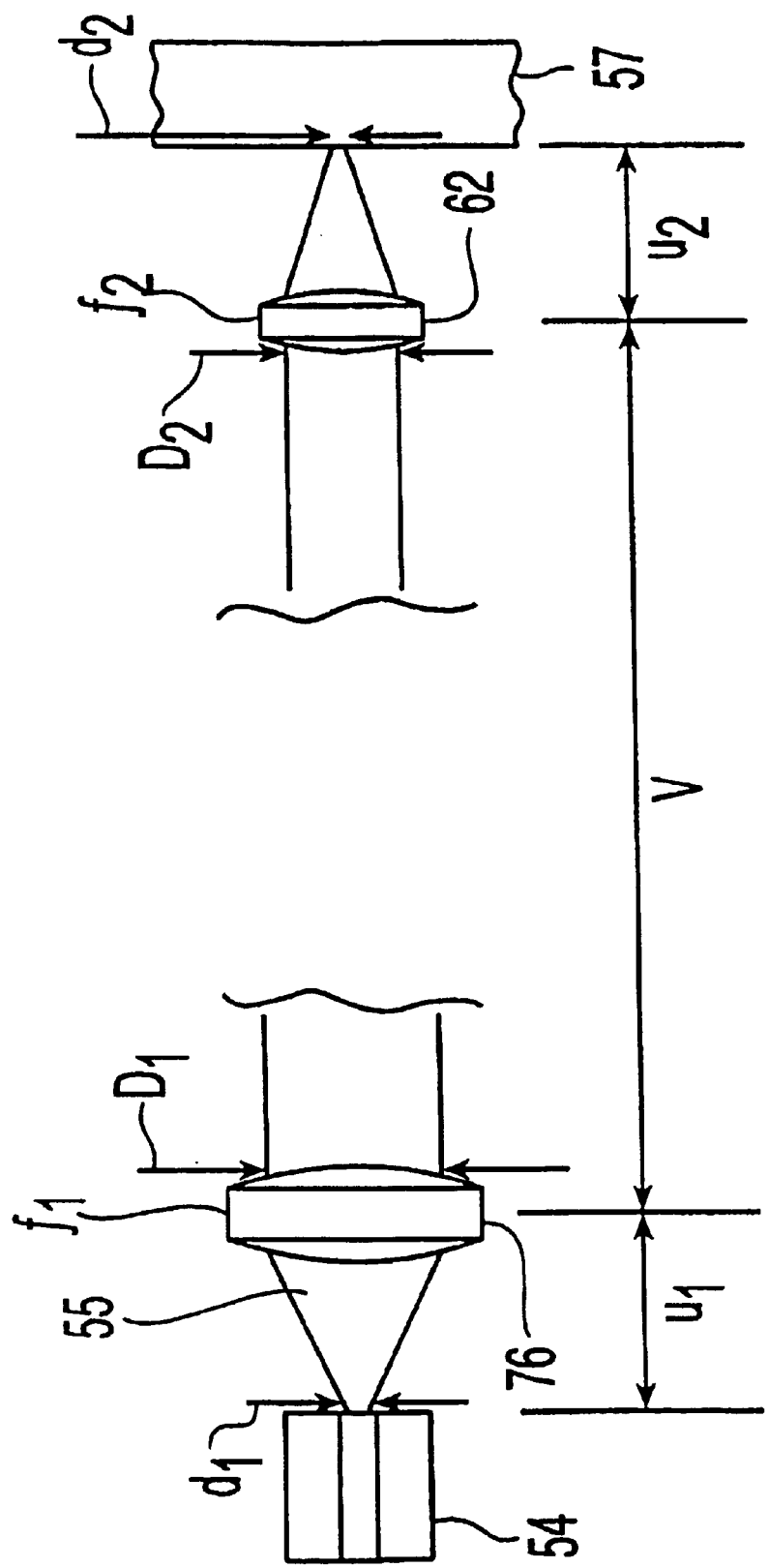
FIG. 39 is a diagram illustrating optics of the present invention.

FIG. 39 shows a preferred embodiment of the present invention wherein a laser lens 76 is placed in the optical path of the beam 55 between the laser and the R/W objective lens 62. Since collimating the laser beam 55 can lead to a significant loss of light in the optical system of the present invention due the optical distance between the laser lens and the R/W objective lens, proper arrangement of the optical disk drive of the present invention takes into account the following equations. The laser emitting area, with diameter $d_1$, is preferably imaged onto the aperture of the R/W objective lens 62:

$$1/f_1 = 1/u_1 + 1/v \text{ and } D_2 = m_1 * d_1 \text{ where } m_1 = v/u_1$$

The read/write spot is preferably imaged onto the laser lens 76:

$$1/f_2 = 1/u_2 + 1/v \text{ and } D_2 = m_2 * d_2 \text{ where } m_2 = v/u_2$$

In addition, the Numerical Aperture ("NA") of the laser preferably matches the lens as follows:

$$NA_{laser} = \mathrm{Sin}((D_1/2)/u_1)$$

Similarly:

$$NA_{spot} = \mathrm{Sin}((D_2/2)/U_2)$$

Loss of light will result if any of the above equations is not satisfied. All the mirrors and beam splitters in the optical path are planar and will not influence the imaging. A similar arrangement applies to the detector and its lens.

Figure 41:
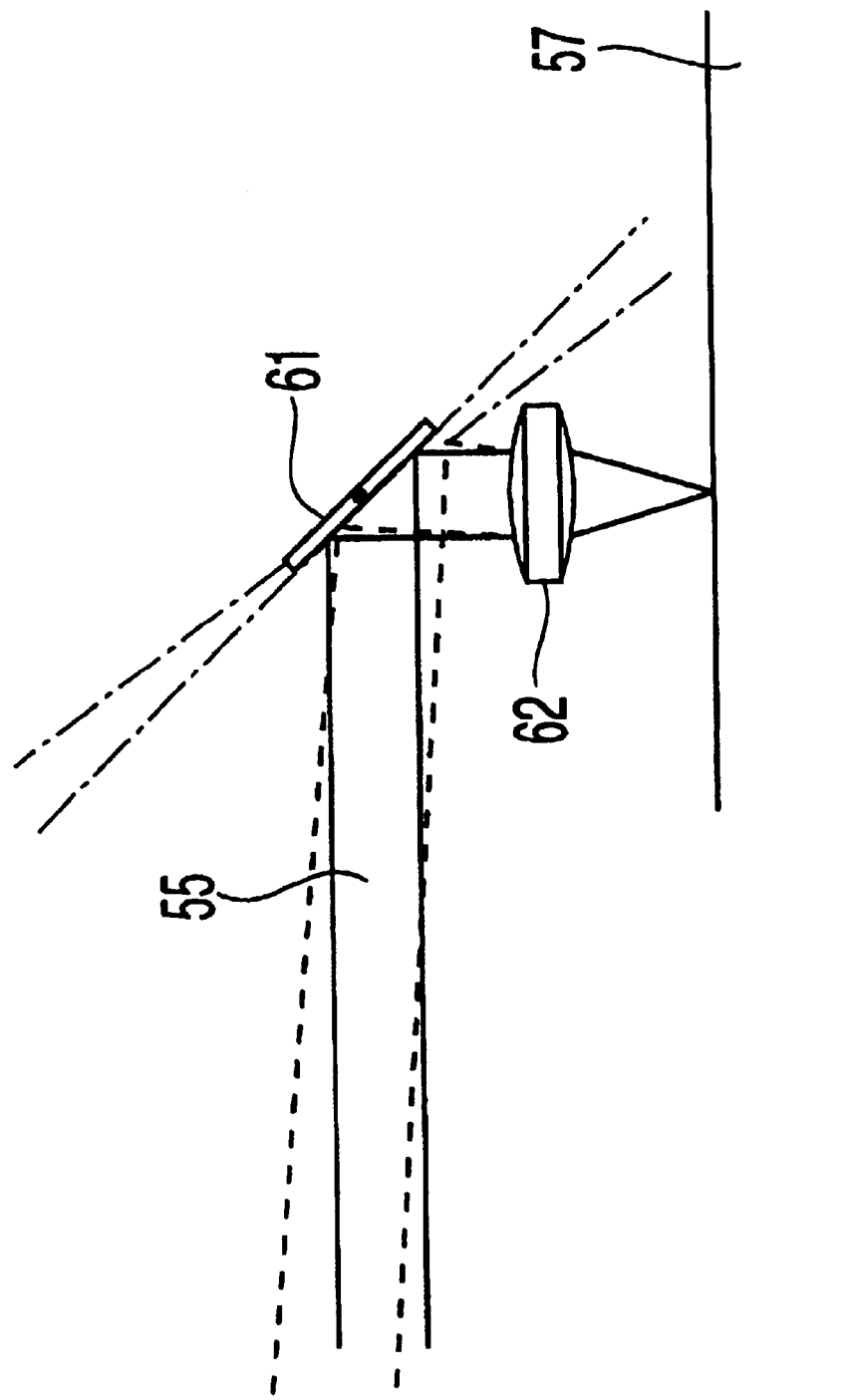
FIG. 41 is a diagrammatic perspective view of a head member with respect to the optical disk, illustrating the effects of the light beam focused onto the disk surface as the angle of the head mirror is changed.

Although the head mirrors 61 can be fixed or non-moveable, as is best shown in FIG. 41, the head mirrors can be moveable mirrors to provide more precise alignment since the exact positioning of these mirrors determines the direction from which the beam arrives at the R/W objective lens 62. For purposes of controlling the angle at which the beam passes through the R/W objective lens, the head mirror may be moveable or foldable one or two degrees of freedom. The alignment of these moveable mirrors can be controlled by a processor, and these moveable head mirrors may be constructed using MEMS technology as described above.

Figure 42:
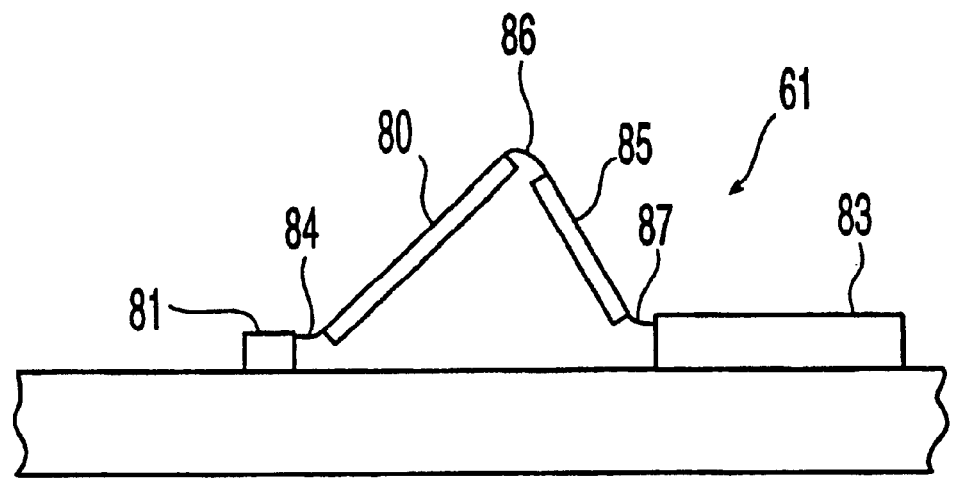
FIG. 42 is a side elevational view of a foldable mirror according to the present invention.
Figure 43:
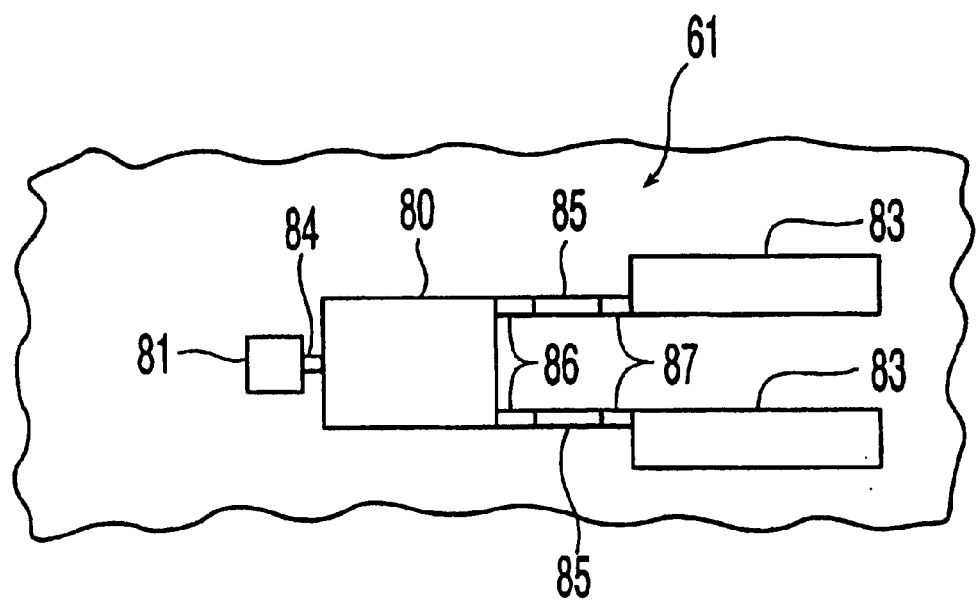
FIG. 43 is a top plan view of the foldable mirror of FIG. 42.

Another embodiment of the moveable head mirror 61 of the present invention is shown in FIGS. 42 and 43. In this embodiment, the moveable head mirror 61 includes a reflector 80 supported between a support base 81 and two linear actuators 83, a first linear actuator and a second linear actuator. The reflector 80 is pivotally connected at one end to the support base 81 via a first hinge 84. In addition, bars 85 are pivotally connected to a second end of the reflector 80 by a second set of hinges 86 and to the first and second linear actuators 83 by a third set of hinges 87. The linear actuators 83 control the orientation of the reflector 80 with the two degrees of freedom about the first hinge 84 required for both focus and tracking control. All of these parts can be manufactured in a MEM process. The moveable head mirror 61 may be aligned initially and held in that position or may be adjusted continuously for focusing and tracking purposes. In addition, the moveable head mirror 61 may be used for slow adjustments; for example, to correct focus drift associated with temperature changes.

The optical switch of the present invention having first and second moveable mirrors also includes at least one servo mechanism that is operatively connected to either the first or second moveable mirrors. Preferably, the servo mechanism is operatively connected to both moveable mirrors. Alternatively, multiple servo mechanisms may be used, one each for the first and second moveable mirrors or multiple servo mechanisms for each of the first or second moveable mirrors. Based upon input and information received by the servo mechanism, the moveable mirrors are rotatively adjusted about the first and second axes of rotation. These adjustments are made in order to maximize the transmission of the light beam through the optical switch. The servo mechanism may also be operatively connected to other devices in the optical switch including the optical inputs, the optical outputs, additional lenses and other optical devices in the optical switch. When attached to the optical inputs and outputs another servo mechanism may function as a focus servo to adjust the distance between the face or ends of the optical inputs and outputs and the internal optical devices. Focusing may be achieved through various mechanisms including magnetic and piezoelectric mechanisms.

At least one of the optical inputs and one of the optical outputs are a plurality of optical fibers such as a bundle of optical fibers. Each of the optical fibers includes a fiber core for propagating a beam of light such as a data signal. The fiber core is encased in a cladding. The fiber core may be circular or elongated in shape, and the fiber core and cladding are arranged concentrically. The number of optical fibers in fiber bundles vary depending upon the amount of data to be carried.

A servo mechanism, according to the present invention, monitors various parameters within the optical switch. These parameters provide information about the transmission of light from the optical inputs to the optical outputs. The servo mechanism uses the information about these parameters to make adjustments to the alignment of the various components of the optical switch. In particular, the servo mechanism uses the information obtained to adjust the angular rotation or displacement of the first and second moveable mirrors about the first and second axes of rotation. These adjustments are made in order to optimize the transmission of optical light through the switch. The servo mechanisms of the present invention can be used to maximize the transmission of a light beam between any optical input and optical output. Preferably, the servo mechanism is used to optimize the transmission of light between two optical fibers.

In order to provide for a rapid initial alignment between any output and any input, the servo mechanism may include a memory storage device or other similar component to store data regarding the arrangement of the components in the optical switch needed to align any input with any output. For example, this stored information can include data regarding the displacement about both the first and second axes of rotation for both the first and second moveable mirrors. Therefore, when a given input and a given output are selected by the switch, the servo mechanism would read the initial alignment data and move the first and second moveable mirrors accordingly. Since wear associated with time and other environmental conditions may cause changes in the required alignment, additional servo mechanisms are used to refine the alignment of the inputs and outputs and the associated alignments of the first and second moveable mirrors.

An initial piece of information that the servo mechanism may use is the amount of light that does not pass from an input fiber core to an output fiber but instead passes into the cladding, i.e., cladding modes. In order to measure the amount of light in the cladding, at least one optical fiber in the fiber bundle is coated with a buffer having a refractive index that is lower than the refractive index of the cladding itself. Therefore, the light within that cladding will remain in the cladding. The servo mechanism includes an optical detector that is connected to this fiber in an area that does not contain this buffer. The optical detector measures the amount of light within the cladding. This arrangement measures the amount of light in the cladding of a single fiber.

Preferably, the light from all of the claddings in the bundle is collected and measured. In order to achieve this, the bundle of optical fibers is held together with a binding glue that has a refractive index that is higher than that of the claddings, permitting the cladding light to pass from the cladding to the glue and from cladding to cladding. A large area optical detector is then attached to the bundle and measures the aggregate light within the claddings.

Figure 44:
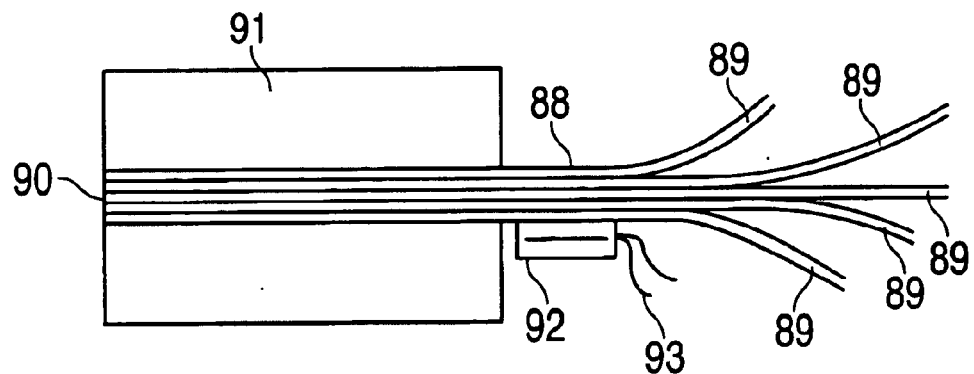
FIG. 44 is a cross sectional view of a bundle of optical fibers illustrating a servo mechanism of the present invention.

As is best shown in FIG. 44, the bundle 88 of optical fibers 89 has an end 90 to permit beams of light to enter and exit the optical fibers 89. The end 90 is bound together by a ferrule 90. In one embodiment, the ferrule 91 is made of material that has a refractive index that is lower than the refractive index of the glue that holds together the optical fibers 89, and this binding glue has an index of refraction that is greater than the index of refraction of the cladding. Therefore, light within all of the claddings is aggregated and confined within the area of the ferrule. A large area optical detector 92 is attached to the bundle 88 adjacent the ferrule 91. The large area optical detector includes electrical leads 93 for connection to control mechanisms within the servo mechanism.

Figure 45:
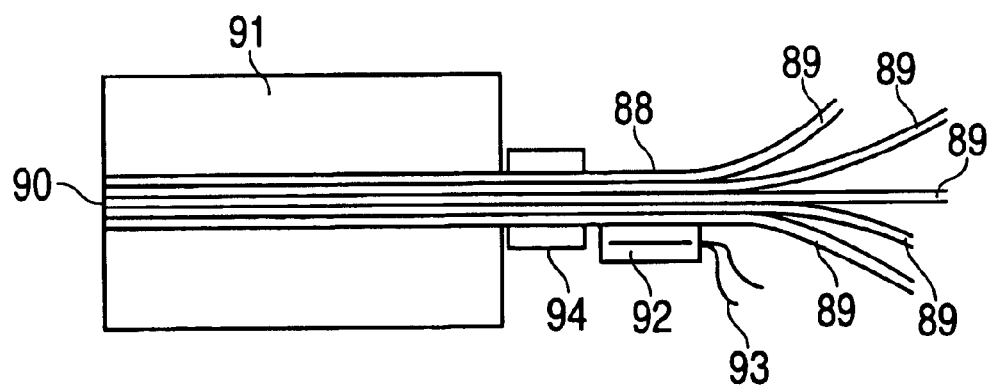
FIG. 45 is a cross sectional view of a bundle of optical fibers illustrating another embodiment of the servo mechanism.

Referring to FIG. 45, the optical fibers 89 may be bound together with a first glue having an index of refraction that is lower than the index of refraction of the cladding to keep the cladding light within each cladding. In this embodiment, the index refraction of the material making up the ferrule may be either grater than or less than the refractive index of the first glue. A glass sleeve 94 surrounds the bundle 88 adjacent the ferrule. The optical fibers 89 surrounded by the glass sleeve 94 are bound together with a second glue having an index of refraction which is higher than the index refraction of the cladding and, the index refraction of the glass sleeve 94 is less than the index of refraction of the second binding glue. The large area optical detector 92 is attached to the bundle 88 adjacent the ferrule 91. Thus, light in the cladding passes from the end 90 of the bundle 88 through the ferrule 91, remaining in the individual claddings. As the cladding light passes into the area of the bundle 88 surrounded by the glass sleeve 94, all of the light is allowed to pass from the cladding to the glue and from cladding to cladding. The large area optical detector 92 adjacent the glass sleeve 94 can then detect this combined total cladding light.

Figure 46:
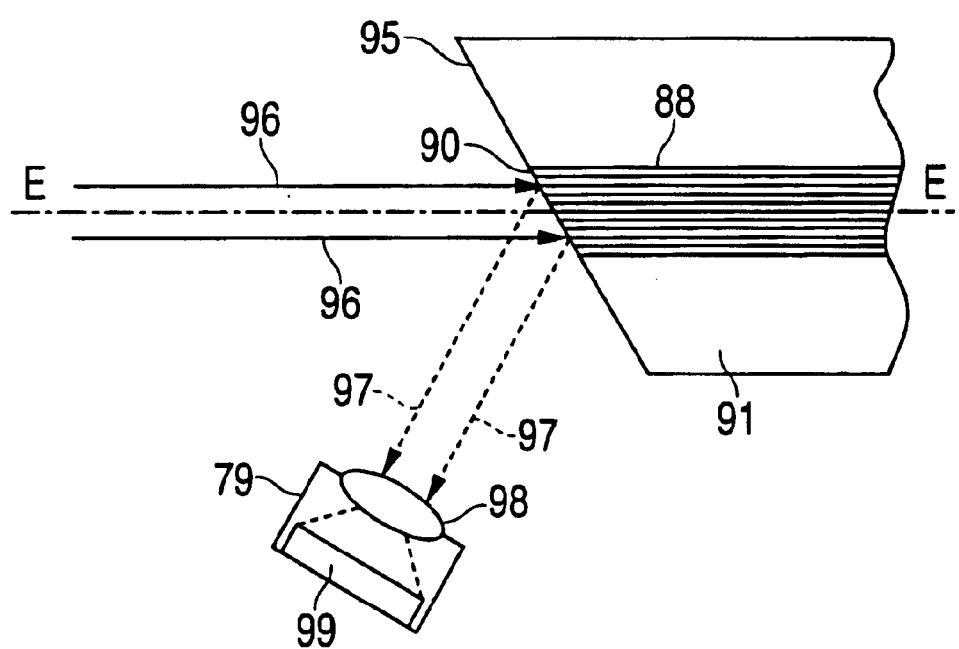
FIG. 46 is a cross sectional view of an angled ferrule face of a bundle of optical fibers according to the present invention.

Referring to FIG. 46, the ferrule has a face 95 corresponding to the end 90 of the fiber bundle 88. Although this face 95 can define a plane that is perpendicular to the axis E defined by the path of the light beam 96 entering or exiting the optical fibers 89, configuring the face 95 at an angle greater than or less than 90° with respect to the light beam axis E produces a reflected light beam 97 that can be detected by an optical detector or an optical position sensing device 79. Preferably, the optical position sensing device 79 includes a focusing lens 98 to focus the reflected beam on to an optical detector 99. The ferrule face 95 may be polished to provide for increased or adequate reflection of at least a portion of the light beam 96.

Figure 47:
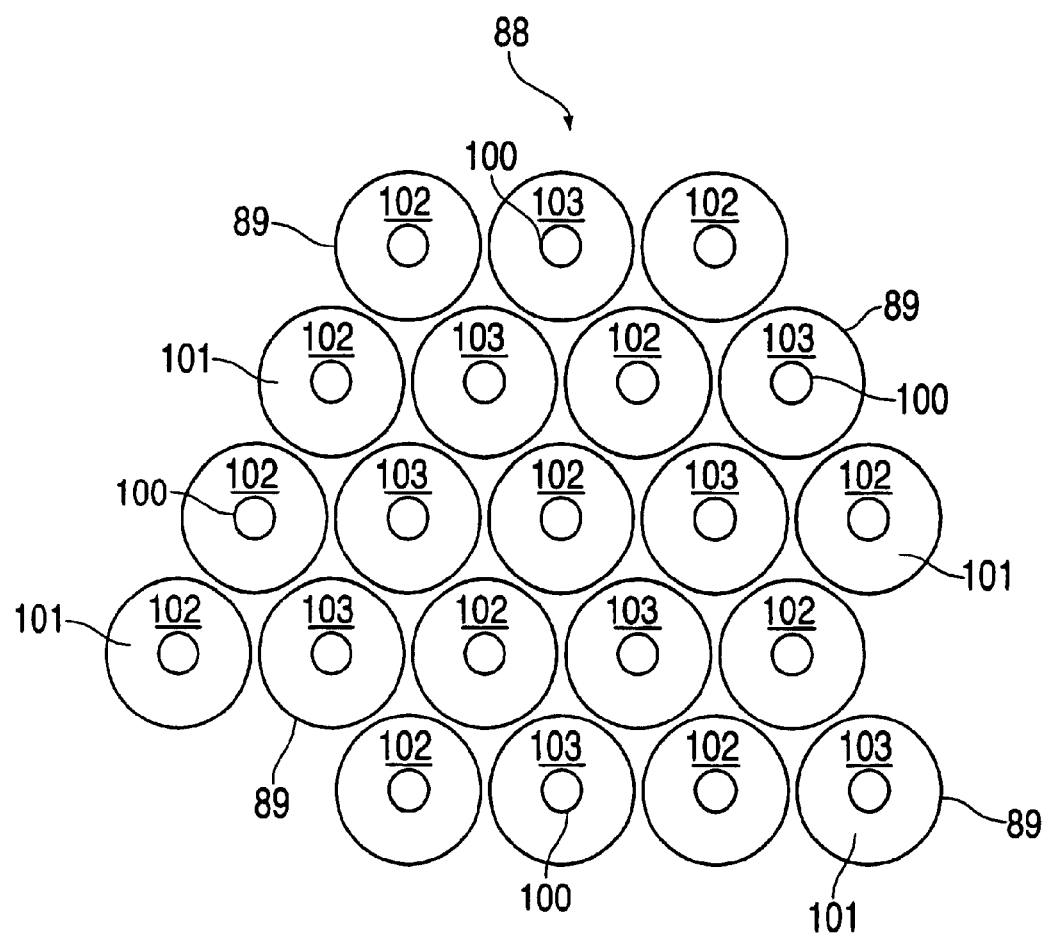
FIG. 47 is a partial end view of a bundle of optical fibers.

A servo mechanism according to one embodiment of the present invention utilizes the optical fibers 89 themselves to aid in optical alignment. As is best shown in FIG. 47, optical fibers 89, having a core 100 and a cladding 101, can include data fibers 102 and control fibers 103. The data fibers 102 carry the data that is propagated, for example, through a fiber optic network. The control fibers 103 can be attached to control light sources or detectors independent of any data signals. Preferably, each data fiber 102 has an associated control fiber 103 such that the fibers are arranged in pairs. Therefore, aligning a first control fiber 103 in an optical input bundle 88 with a second control fiber 103 in an optical output bundle 88 by passing light from a control light source through the first and second controls fibers to a detector, causes associated first and second data fibers 102 to be aligned by the optical switch.

Figure 48:
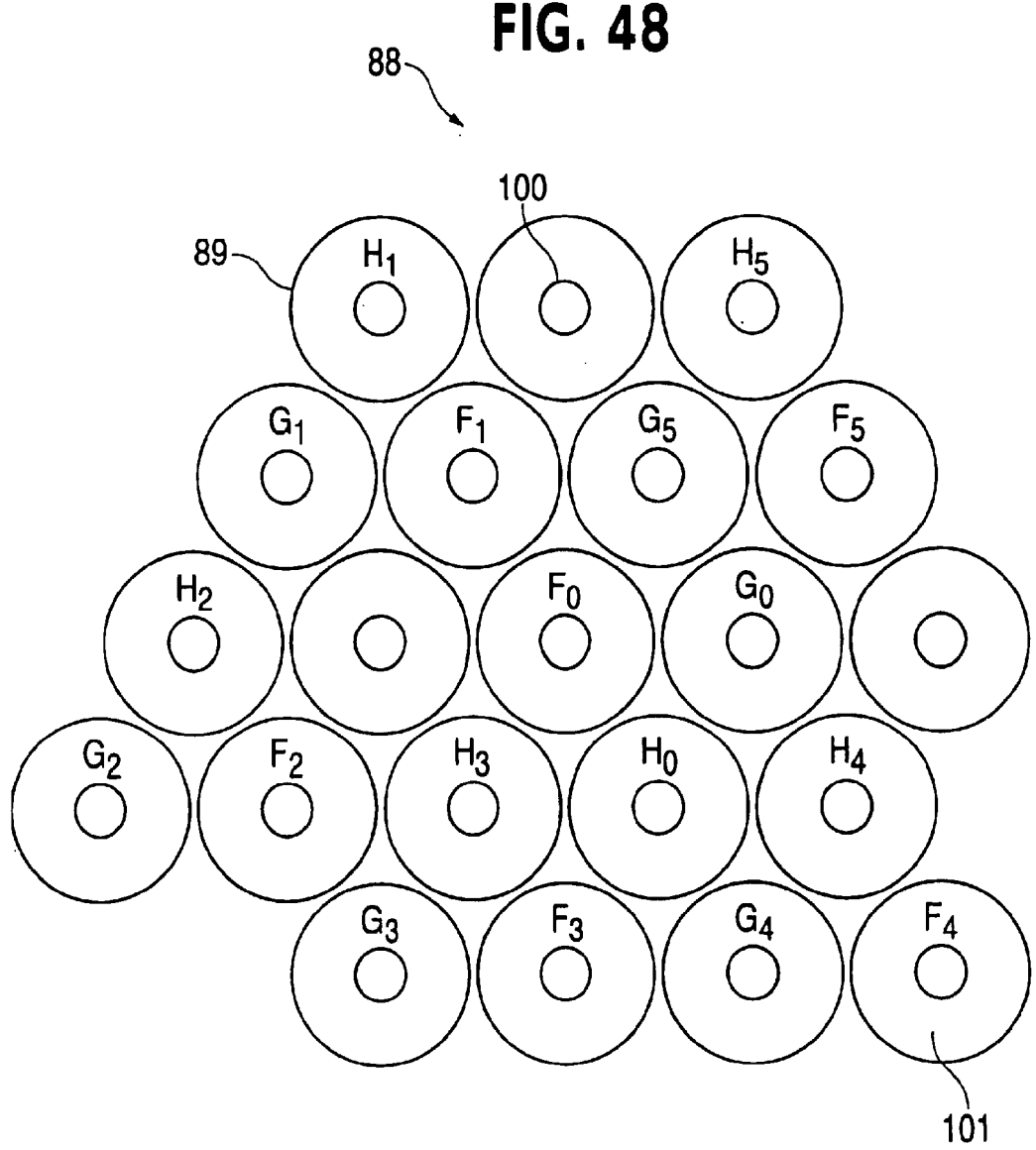
FIG. 48 is a partial end view of a bundle of optical fibers.

Referring to FIG. 48, a single bundle 88 can be associated with the optical switch of the present invention, and the optical fibers 89 within that bundle 88 constitute both the optical inputs and the optical outputs to the switch. A 2×10 switch is illustrated having two data input fibers $F_0$, $G_0$ and one control input fiber $H_o$. Through proper alignment of the components of the optical switch, the control signal from the control input fiber $H_0$ is directed to one of five control output fibers $H_1$ $H_5$. This alignment causes the data signals from the data input fibers $F_0$, $G_0$ to pass to the corresponding data output fibers $F_1$–$F_5$, $G_1$–$G_5$.

Figure 49:
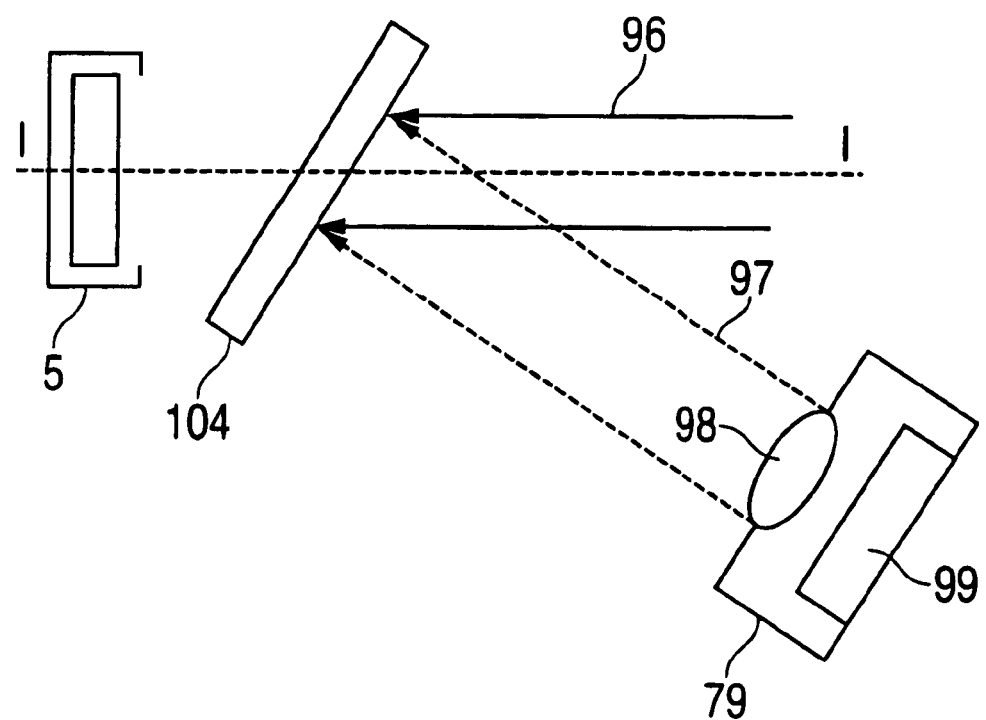
FIG. 49 is a schematic of a window arrangement in the optical switch of the present invention.

Referring to FIG. 49, the servo mechanism of the present invention can employ a window 104 positioned in the path of the light beam 96 passing through the optical switch. Preferably, the window 104 is positioned in front of the first or the second moveable mirror 5, 6. The window is position at angle with respect to an axis I perpendicular to the moveable mirror 5 that is less than or greater than 90°. The window 104 is made from a material, such as glass, that is selected to have high optical transmission and low optical reflection. The servo mechanism includes a position sensitive detector 79 which can include a focusing lens 98 and an optical detector 99. Preferably, the optical detector 99 is a quadrant detector. The light beam 96 passes through the window 104 before intersecting the moveable mirror 5, generating a reflected light beam 97. The relative position of the reflected light beam 97 is determined by the position sensitive detector 79, and this information is used by the servo mechanism to adjust the alignment of the components of the optical switch.

In general, suitable optical detectors 99 for the servo mechanism of the present invention include quadrant detectors, optical position sensors with position sensitivity, CCD matrix detectors and any optical detector that can detect both the presence of an optical beam and the beam"' relative position on the optical detector.

Figure 50:
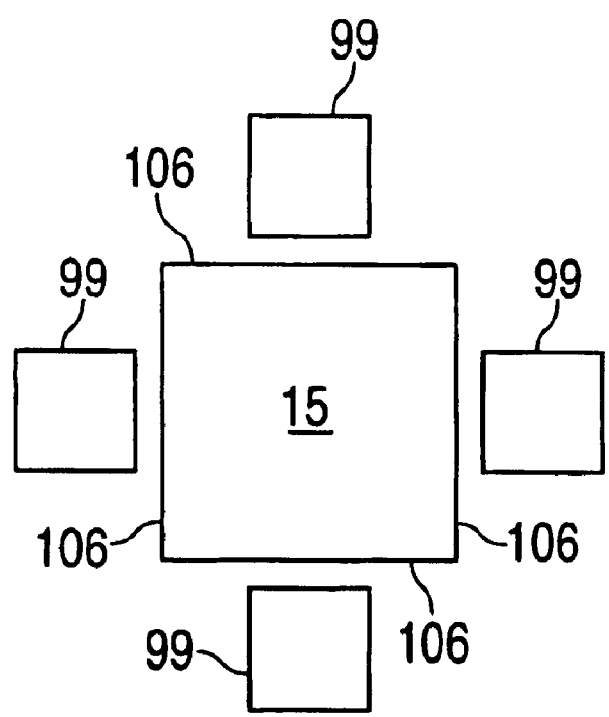
FIG. 50 is a plan view of a moveable mirror and optical detectors.

In another embodiment of the servo mechanism of the present invention, a plurality of the optical detectors 99 can be positioned adjacent to the first and second moveable mirrors such that light beams incident upon the moveable mirrors but not hitting the reflective surface of the moveable mirror can be detected by the optical detectors. In one embodiment, the servo mechanism includes at least three optical detectors for each moveable mirror positioned around the first and second moveable mirrors. In a preferred embodiment as shown in FIG. 50, the reflective surfaces on the top faces 15 of both the first and second moveable mirrors are generally rectangular in shape, and the servo mechanism includes four optical detectors 99 for each moveable mirror, one detector 99 each for the four sides of the top face 15. In general, the detectors are positioned adjacent to the edges 106 of the top face 15 and intercept light that is not incident upon on the reflective surface.

Another embodiment of the servo mechanism of the present invention includes at least one position sensitive detector positioned within the optical switch to detect light that is generally scattered from one of the first or second moveable mirrors. Preferably in this embodiment, the servo mechanism includes a plurality of position sensitive detectors.

Figure 40:
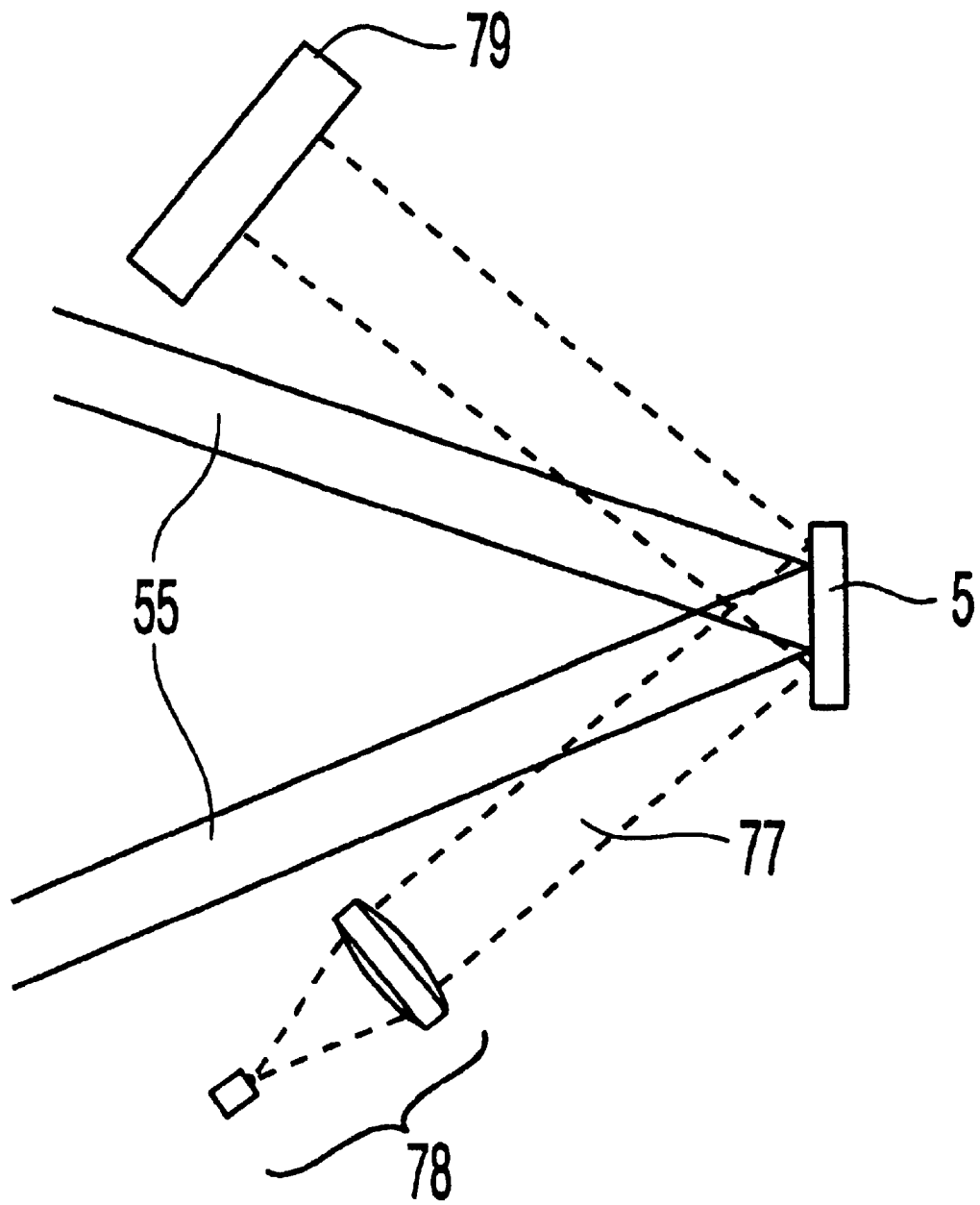
FIG. 40 is a diagrammatic perspective view of a control system to provide a feedback on the orientation of a mirror of the present invention.

As is best shown in FIG. 40, the servo mechanism includes an auxiliary light source 78 independent of either a data light beam or a control light beam. This auxiliary light source may be completely internal to the optical switch itself or provided from a source external to the optical switch. The auxiliary light source 78 is aimed at any one of the optical components within the optical switch including the ferrule faces 95 of the inputs and outputs, lens, windows 104, and moveable mirrors 5, 6. The auxiliary light source is aimed at these components at an angle or along an axis that differs from the axes of the data beams and control beams within the optical switch. The servo mechanism also includes at least one optical detector 99 or position sensitive detector to detect 79 the auxiliary light beam 77 from the auxiliary light source that is reflected off of the moveable mirrors or other optical components. The servo mechanism analyzes the location of the reflected auxiliary beam 77 to determine the angling and position of the optical component at which it is aimed. The auxiliary light source 78 is preferably modulated to improve the signal to noise ratio. When the auxiliary light beam 77 is directed to the first moveable mirror 5 the optical detector 79 is preferably the size of the second moveable mirror 6. In addition, when the auxiliary light source 77 is directed to the second moveable mirror 6 the detector is preferably the size of the area occupied by all of the outputs to the optical switch and, more preferably, the optical detector 79 is a grouping or an array of a plurality of optical detectors.

Figure 51:
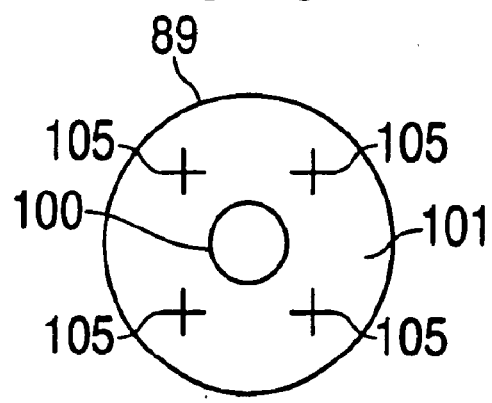
FIG. 51 is an end view of an optical fiber showing an arrangement of fiducials according to the present invention.
Figure 52:
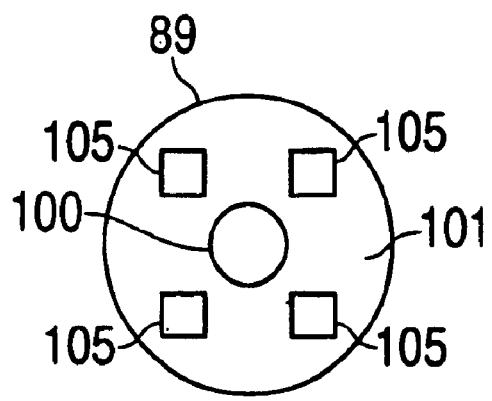
FIG. 52 is an end view of an optical fiber showing another arrangement of fiducials according to the present invention.

Another embodiment of the servo mechanism uses fiducials. Fiducials are small reference points, such as points of light, cross hatches, or dots within the light beam 96 of the optical input or the optical output that provide a reference point for use in alignment, calibration, and accuracy of the inputs, outputs and components of the optical switch. Any number of fiducials may be provided. Preferably four fiducials are provided on either the optical input, the optical output, or both. As is shown in FIG. 51, the fiducials 105 can be markings arranged within the cladding of an end of an optical fiber 89. In this embodiment, an auxiliary light source is aimed at the end of the optical fiber 89 to illuminate the fiducials 105. In another embodiment, as shown in FIG. 52, the fiducials 105 are light emitting sources such as LED"' disposed and arranged within the end of the optical fiber 89. In yet another embodiment as shown in FIG. 53, the fiducials 105 are selected optical fibers 89 arranged with the fiber bundle 88. These fiducials 105 are connected to separate light sources such as LED"' and lasers and may be modulated to aid in their detection.

Lens may be included in the optical switch to either focus or collimate the beams of light passing through the switch. Preferably, the beams, including the data and control light beams, are not collimated but are focused, because a significant amount of light will be lost if the beams of light are collimated and will not enter or will not be incident upon the optical output. Focusing the beams, however, maximizes the amount of light that passes through the optical switch.

A focusing system containing a plurality of focusing lenses associated with the optical inputs and optical outputs may be included in the optical switch of the present invention. Preferably, a first focusing lens is associated with the optical input and a plurality of second focusing lenses are provided each associated with one of the plurality of optical outputs of the optical switch. The optical input is focused by its associated lens to one of the lenses associated with an optical output, where the second focusing lens focuses the light beam onto the associated optical output. In addition, the optical switch includes at least one moveable mirror of the present invention rotatable about two pivot axes to direct the focused light beam from the first focusing mirror to one of the second focusing mirrors associated with one of the optical outputs.

Referring to FIG. 39, in the case where the optical inputs and outputs are bundles of the same type of optical fibers, the optical switch is symmetrical. Each optical fiber carries a gaussinan beam having a diameter $d_{1,2}$ equal to $1/e^2$. This diameter corresponds to the situation where the light intensity in the beam goes to $1/e^2$ of the intensity on axis. The optical fiber has a numerical aperture ("NA") defined as the sine of half the angle of the light exiting from the fiber to air. The numerical aperture is measured at a point in the diameter of the light beam where the intensity is $1/e^2$ of the intensity. The effective aperture of each unit is the one $1/e^2$ diameter $D_{1,2}$ at the lens. Assuming a thin lens approximation, optimal transmission of the optical beams through the optical switch occurs when the following three equations are satisfied:

1. $D_{1,2} = 2 * d_{1,2} * \sin^{-1}(NA)$

2. $1/f_{1,2} = 1/V + 1/u_{1,2}$

3. $d_{1,2} u_{1,2} = D_{1,2}/V$

Where $f_{1,2}$ is the focal length of the first and second focusing lens in the optical switch and the first and second focusing lens are optically separated by a distance V. Both lenses are separated from the respective input and output fibers by a distance $u_{1,2}$. The first diameter of the light beam, for both the optical input and the optical output of the optical switch, is $d_{1,2}$ and the second diameter of the light beam at the first focusing lens and at the second focusing lens is $D_{1,2}$. The numerical aperture is for both the input and the output optical fibers.

While the foregoing preferred embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. An optical switch for switching a light beam from at least one optical input to one of a plurality of outputs, the optical switch comprising:
   a first moveable mirror rotatable about both a first pivot axis and a second pivot axis to reflect the light beam from the optical input;
   a second moveable mirror rotatable about the first and second pivot axes to reflect the light beam reflected from the first moveable mirror; and
   a servo mechanism operatively connected to at least one of the first and second moveable mirrors to control rotation of said mirrors about the first and second axes;
   wherein the first moveable mirror is adjusted to guide the light beam from the optical input to a point on the second moveable mirror, and the second moveable mirror is adjusted to guide the light beam from the first moveable mirror to one of the outputs.

2. The switch of claim 1, wherein at least one of the optical input and the optical outputs comprises a plurality of optical fibers, and each of the optical fibers comprises a fiber core and a cladding surrounding the fiber core.

3. The switch of claim 2, wherein:
   at least one of the optical fibers is coated with a buffer having a refractive index lower than the refractive index of the cladding of that optical fiber, and;
   the servo mechanism comprises an optical detector connected to that fiber.

4. The switch of claim 2, wherein:
   the bundle of optical fibers is held together with a binding glue having a refractive index higher than the refractive index of the cladding; and
   the servo mechanism comprises a large area optical detector attached to the bundle.

5. The switch of claim 4, wherein:
   the bundle comprises and end to permit the light beam to enter and exit the optical fibers;
   the end is bound together by a ferrule having an index of refraction lower than the index of refraction of the binding glue;
   the large area optical detector is disposed adjacent the ferrule.

6. The switch of claim 2, wherein the bundle comprises:
   an end to permit the light beam to enter and exit the optical fibers;
   a ferrule to bind the end of the bundle and a glass sleeve surrounding the bundle and disposed adjacent the ferrule; and
   the servo mechanism comprises a large area optical detector attached to the bundle adjacent the glass sleeve;
   wherein the optical fibers bound by the ferrule are held together with a first binding glue having an index of refraction lower than the index of refraction of the cladding, the optical fibers surrounded by the glass sleeve are held together with a second binding glue having an index of refraction higher than the index of refraction of the cladding, and the glass sleeve has an index of refraction less than the index of refraction of the second binding glue.

7. The switch of claim 2, wherein the optical fibers comprise data fibers and control fibers, each control fiber associated with at least one data fiber, and the servo mechanism aligns a pair of data fibers by aligning a corresponding pair of control fibers.

8. The switch of claim 7 wherein maximizing the amount of a control light beam through the two control fibers maximizes the amount of the light beam in the corresponding pair of data fibers.

9. The switch of claim 1, wherein the servo mechanism comprises a stored memory of an angular rotational position about both the first and second axes of rotation for both the first and second moveable mirrors to cause the light beam to pass from the optical input to each on one of the plurality of outputs.

10. The switch of claim 4, wherein the bundle comprises an end to permit the light beam to enter and exit the optical fibers and a ferrule to bind the end of the fibers, the ferrule having a face corresponding to the end of the bundle and angled such that the face intersects an axis, defined by the path of the light beam entering or exiting the optical fibers, at an angle less than or greater than 90°, the face polished to provide for adequate reflection of the light beam; and
   the servo mechanism comprises;
      a focusing lens for focusing the reflected light beam from the ferrule face; and
      a position detector for receiving and detecting the focused light beam.

11. The optical switch of claim 1, wherein the servo mechanism comprises:
   at least one window, said window positioned adjacent one of said first and second moveable mirrors such that the light beam passes through the window before being reflected by the mirror, the window selected to have a high optical transmission and low optical reflection; and an optical detector for receiving and detecting a reflected light beam from the window.

12. The optical switch of claim 11, wherein the optical detector is a quadrant detector.

13. The optical switch of claim 1, wherein the servo mechanism comprises at least one optical detector positioned adjacent at least one of the first and second moveable mirrors to detect portions of the light beam that do not intersect the mirror.

14. The optical switch of claim 1, wherein the servo mechanism comprises at least three optical detectors for each moveable mirror, the optical detectors positioned around the moveable mirrors.

15. The optical switch of claim 1, wherein the servo mechanism comprises at least one position sensitive detector positioned to detect light scattered from at least one of the first and second moveable mirrors, the position sensitive detector comprising a lens for focusing the scattered light and an optical detector to receive the focused light.

16. The optical switch of claim 1, wherein the servo mechanism comprises at least one auxiliary light source to direct an auxiliary beam of light onto at least one of the first and second moveable mirrors and at least one optical detector positioned to detect the auxiliary light beam reflected by the moveable mirrors.

17. The optical switch of claim 16, wherein the auxiliary beam of light is modulated to improve signal to noise ratio.

18. The optical switch of claim 16, wherein the auxiliary light beam is directed to the first moveable mirror, and the size of the detector equals the size of the second moveable mirror.

19. The optical switch of claim 16, wherein the auxiliary light beam is directed to the second moveable mirror, and the size of the detector equals the area occupied by the plurality of outputs.

20. The optical switch of claim 19, wherein the optical detector is a grouping of a plurality of small detectors.

21. The optical switch of claim 19, wherein the servo mechanism further comprises a plurality of fiducials to define reference points in the reflected light beam for calibration of the optical detector.

22. The optical switch of claim 21, wherein the position detector is an optical position sensor having position sensitivity or a CCD matrix detector.

23. The optical switch of claim 21, wherein the fiducials are light sources disposed in the cladding of each optical fiber.

24. The optical switch of claim 21, wherein the fiducials are one or more optical fibers within a bundle of optical fibers.

25. The optical switch of claim 1, wherein the moveable mirrors are MEM type mirrors.

26. An optical switch for switching a light beam from at least one optical input to one of a plurality of outputs, the optical switch comprising:

a first focusing lens to receive the light beam from the optical input;

a plurality of second focusing lenses to receive the light beam from the first focusing lens and to focus that beam to one of the outputs; and at least one movable mirror rotatable about both a first pivot axis and a second pivot axis to direct the light beam from the optical input to one of the plurality of optical outputs.

27. The optical switch of claim 26, wherein the optical input and the optical outputs comprise optical fibers.

28. The optical switch of claim 27, wherein the light beam has a first diameter (d) at both the optical input and the optical output and a second diameter (D) at the first focusing lens and at the second focusing lenses, and each optical fiber has a numerical aperture (NA) such that:

$$D = 2d \sin^1 (NA).$$

29. The optical switch of claim 28, wherein both the first and second focusing lenses have a focal length (f), are optically separated by a distance (V), and are spaced from respective input and output fibers by distance (u) such that:

$$1/f = 1/V + 1/u.$$

30. The optical switch of claim 29, wherein:

$$\frac{d}{u} = \frac{D}{V}.$$

31. The optical switch of claim 26, wherein the moveable mirror is a MEM type mirror.

32. An optical switch for switching a light beam from at least one optical input to one of a plurality of outputs, the optical switch comprising:

a first moveable mirror rotatable about both a first pivot axis and a second pivot axis to reflect the light beam from the optical input;

a second moveable mirror rotatable about the first and second pivot axes to reflect the light beam reflected from the first moveable mirror;

a servo mechanism operatively connected to at least one of the first and second moveable mirrors to control rotation of the mirrors about the first and second axes; and a focusing system to focus the light beam, the focusing system comprising a first focusing lens associated with the optical input and a plurality of second focusing lenses each associated with one of the plurality of optical outputs.

33. The optical switch of claim 32, wherein the moveable mirrors are MEM type mirrors.

* * * * *